(12) United States Patent
Hussein et al.

(10) Patent No.: US 11,118,613 B2
(45) Date of Patent: *Sep. 14, 2021

(54) PHONONIC MATERIALS USED TO CONTROL FLOW BEHAVIOR

(71) Applicant: The Regents of the University of Colorado, a body corporate, Boulder, CO (US)

(72) Inventors: Mahmoud I. Hussein, Superior, CO (US); Sedat H. Biringen, Boulder, CO (US); Osama R. Bilal, Boulder, CO (US); Alec Kucala, Lafayette, CO (US)

(73) Assignee: The Regents of the University of Colorado, a body corporate, Denver, CO (US)

( * ) Notice: Subject to any disclaimer, the term of this patent is extended or adjusted under 35 U.S.C. 154(b) by 1358 days.

This patent is subject to a terminal disclaimer.

(21) Appl. No.: 14/811,801

(22) Filed: Jul. 28, 2015

(65) Prior Publication Data

US 2016/0097410 A1   Apr. 7, 2016

Related U.S. Application Data

(60) Provisional application No. 62/030,048, filed on Jul. 28, 2014.

(51) Int. Cl.
| | |
|---|---|
| *B64C 21/00* | (2006.01) |
| *F15D 1/00* | (2006.01) |
| *B64C 21/10* | (2006.01) |
| *G10K 11/162* | (2006.01) |
| *G10K 11/165* | (2006.01) |
| *G10K 11/16* | (2006.01) |

(52) U.S. Cl.
CPC ............ *F15D 1/0025* (2013.01); *B64C 21/00* (2013.01); *B64C 21/10* (2013.01); *F15D 1/006* (2013.01);

(Continued)

(58) Field of Classification Search
CPC ......... B64C 21/00; B64C 21/10; B64C 23/00; B64C 23/005; C09K 3/00; B23P 17/00;
(Continued)

(56) References Cited

U.S. PATENT DOCUMENTS 9,410,873 B2 *   8/2016   Wilson ............. B01L 3/502707
10,283,689 B2 *   5/2019   Hussein ................. H01L 35/04
(Continued)

OTHER PUBLICATIONS

International Searching Authority/US International Search and Written Opinion dated Jan. 28, 2016 in reference to co-pending International Application No. PCT/US2015/042545 filed Jul. 28, 2015.

*Primary Examiner* — Richard R. Green
*Assistant Examiner* — Michael A. Fabula
(74) *Attorney, Agent, or Firm* — FisherBroyles, LLP; Thomas J. Osborne, Jr.

(57) ABSTRACT

A phononic material and a method of using a phononic material for use in interacting with a fluid or solid flow are provided. The phononic material includes an interface surface and a subsurface feature. The interface surface is adapted to move in response to a pressure associated with at least one wave in a flow exerted on the interface surface. The subsurface feature extends from the interface surface. The subsurface feature comprises a phononic crystal or locally resonant metamaterial adapted to receive the at least one wave having the at least one frequency based upon the pressure from the flow via the interface surface and alter the phase of the at least one wave. The interface surface is adapted to vibrate at a frequency, phase and amplitude in response to the manipulated/altered phase of the at least one wave.

21 Claims, 16 Drawing Sheets

(52) U.S. Cl.
CPC ............ *F15D 1/0085* (2013.01); *G10K 11/16* (2013.01); *G10K 11/162* (2013.01); *G10K 11/165* (2013.01)

(58) Field of Classification Search
CPC ............... B01F 13/0071; B01F 11/0266; B01J 19/0093; G10K 11/162; G10K 11/16; G10K 11/165; F15D 1/002; F15D 1/0025; F15D 1/0065; F15D 1/007
See application file for complete search history.

(56) References Cited

U.S. PATENT DOCUMENTS

| | | |
|---|---|---|
| 2009/0295505 A1 | 12/2009 | Mohammadi et al. |
| 2012/0097204 A1* | 4/2012 | Yu .......................... B82Y 30/00 136/200 |
| 2012/0149126 A1* | 6/2012 | Wilson ................ B01F 11/0266 436/175 |
| 2012/0325747 A1 | 12/2012 | Rietman et al. |
| 2013/0025961 A1 | 1/2013 | Koh et al. |
| 2013/0255738 A1* | 10/2013 | Mitrovic ................. H01L 35/26 136/200 |
| 2014/0090358 A1* | 4/2014 | Zonenberg .............. F02K 99/00 60/204 |
| 2015/0015930 A1* | 1/2015 | Hussein ................. G02B 1/002 359/240 |
| 2016/0189702 A1* | 6/2016 | Blanc .................... G10K 11/04 367/137 |
| 2017/0047499 A1* | 2/2017 | Hussein ................. H01L 35/30 |
| 2017/0125656 A1* | 5/2017 | Hussein ................. H01L 35/04 |
| 2018/0309039 A1* | 10/2018 | Hussein ................. G02B 1/002 |

* cited by examiner

Phononic Crystals
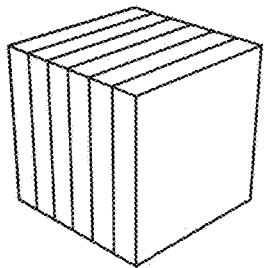
1D
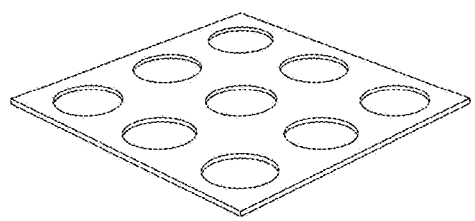
2D
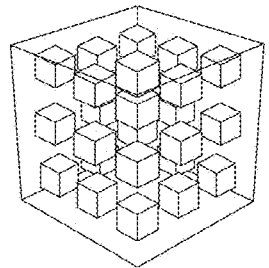
3D
Metamaterials
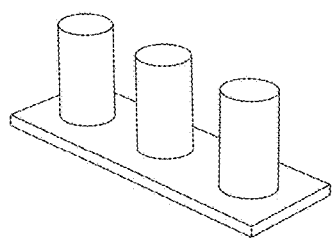
1D
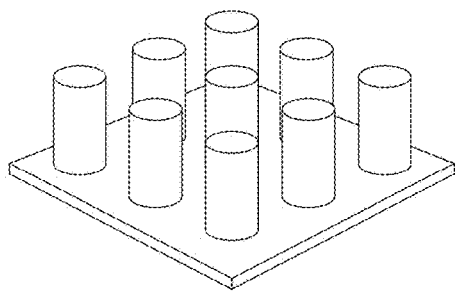
2D
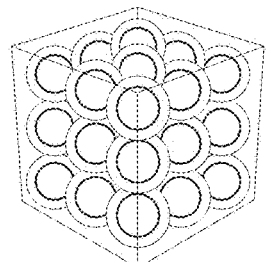
3D
FIG. 3

FIG. 4A
A: ORDERED RESONATORS, SINGLE-SIDED
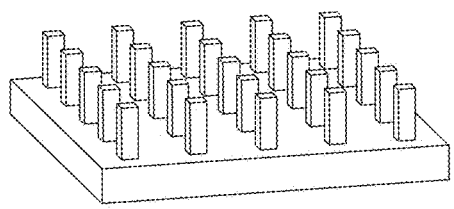 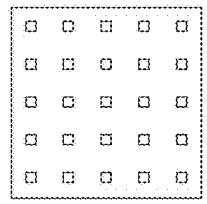
FIG. 4B
B: ORDERED RESONATORS, DOUBLE-SIDED
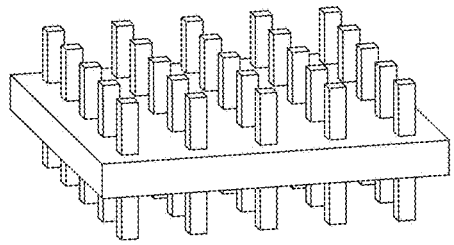 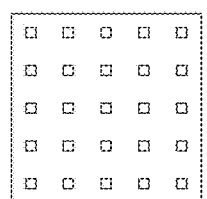
FIG. 4C
C: ORDERED RESONATORS, EMPTY SPACE BETWEEN GROUPS OF RESONATORS
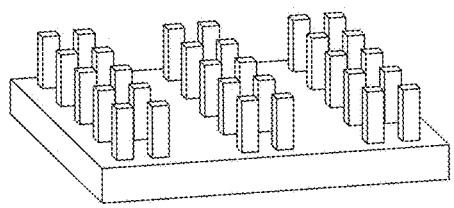 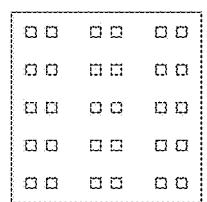
FIG. 4D
D: ORDERED RESONATORS, MULTIPLE RESONATORS OF DIFFERENT HEIGHTS PER UNIT CELL
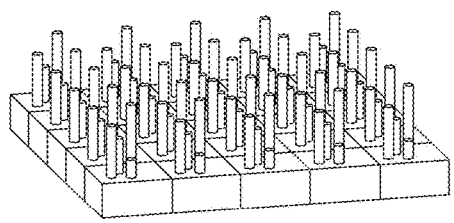 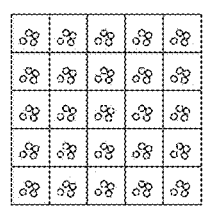
FIG. 4E
E: ORDERED RESONATORS, MULTIPLE RESONATORS OF DIFFERENT THICKNESS PER UNIT CELL
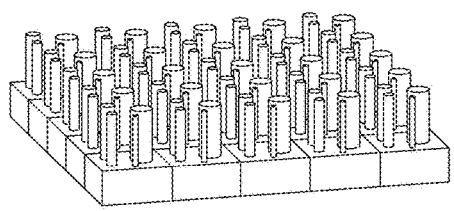 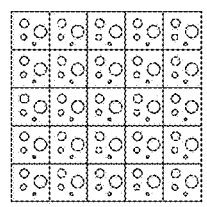

FIG. 6A
A: RESONATORS ORDERED IN POSITIONS AND HEIGHT, RANDOM IN THICKNESS

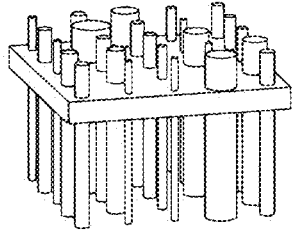 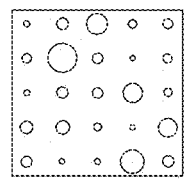

FIG. 6B
B: RESONATORS ORDERED IN POSITIONS AND THICKNESS, RANDOM IN HEIGHT

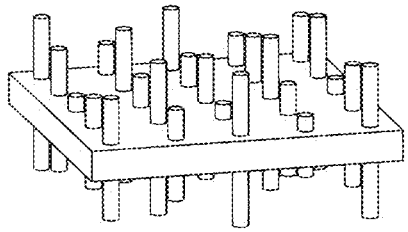 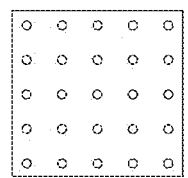

FIG. 6C
C: RESONATORS RANDOM IN POSITION AND HEIGHT, ORDERED IN THICKNESS

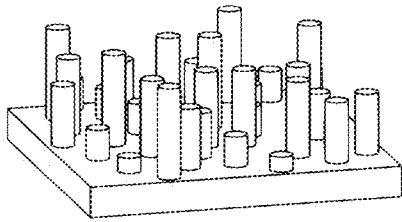 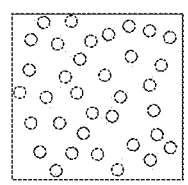

FIG. 6D
D: RESONATORS RANDOM IN POSITION AND THICKNESS, ORDERED HEIGHT

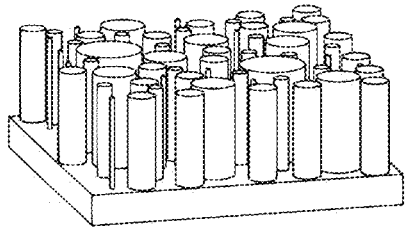 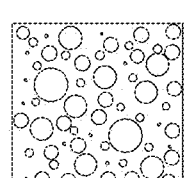

FIG. 6E
E: RESONATORS RANDOM IN POSITION, HEIGHT AND IN THICKNESS

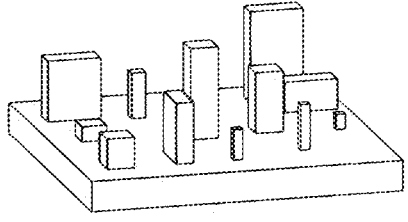 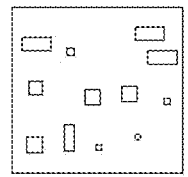

FIG. 6F
F: STACKED 2D NANOPHONONIC METAMATERIAL (E.G., STACKED THIN-FIMLS WITH COLUMNS IN BETWEEN)

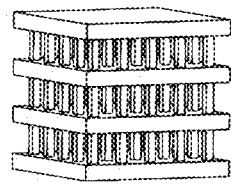

FIG. 7A
A: INTERNAL LOCALIZED RESONATOR
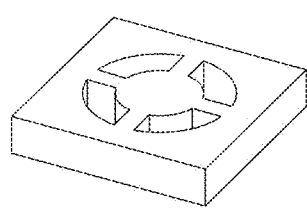
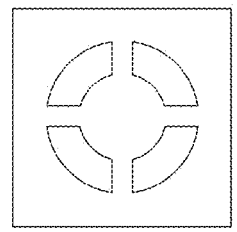
FIG. 7B
B: RESONATOR CONSISTING OF AN INCLUSION MADE OUT OF A MATERIAL SIGNIFICANTLY MORE COMPLIANT THAN THE BASE MATERIAL
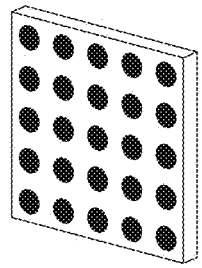
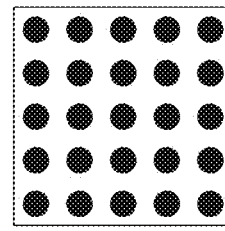

FIG. 8A
A: ORDERED, WALL-LIKE RESONATORS ALIGNED ALONG A SINGLE DIRECTION
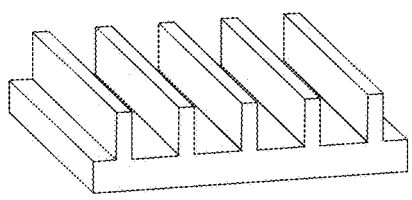 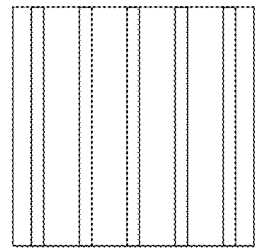
FIG. 8B
B: ORDERED, WALL-LIKE RESONATORS ALIGNED ALONG MULTIPLE DIRECTIONS
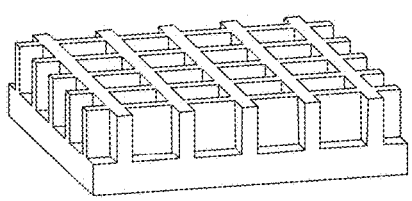 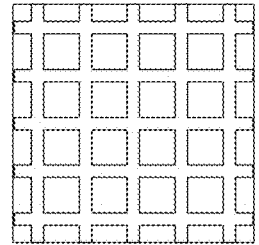

A: ORDERED, UNIFORM HEIGHT OF PILLARS IN THE UNIT CELL

B: ORDERED, MULTIPLE HEIGHTS OF PILLARS IN THE UNIT CELL

A: ORDERED, DISK-LIKE RESONATORS WITH UNIFORM RADIUS

B: ORDERED, DISK-LIKE RESONATORS WITH MULTIPLE RADII IN THE UNIT CELL

A: INTERNAL LOCALIZED RESONATOR

B: RESONATOR CONSISTING OF AN INCLUSION MADE OUT OF A MATERIAL SIGNIFICANTLY MORE COMPLIANT THAN THE BASE MATERIAL

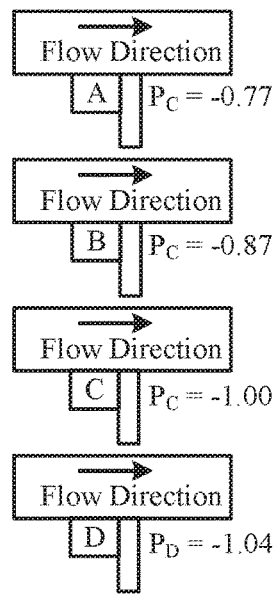
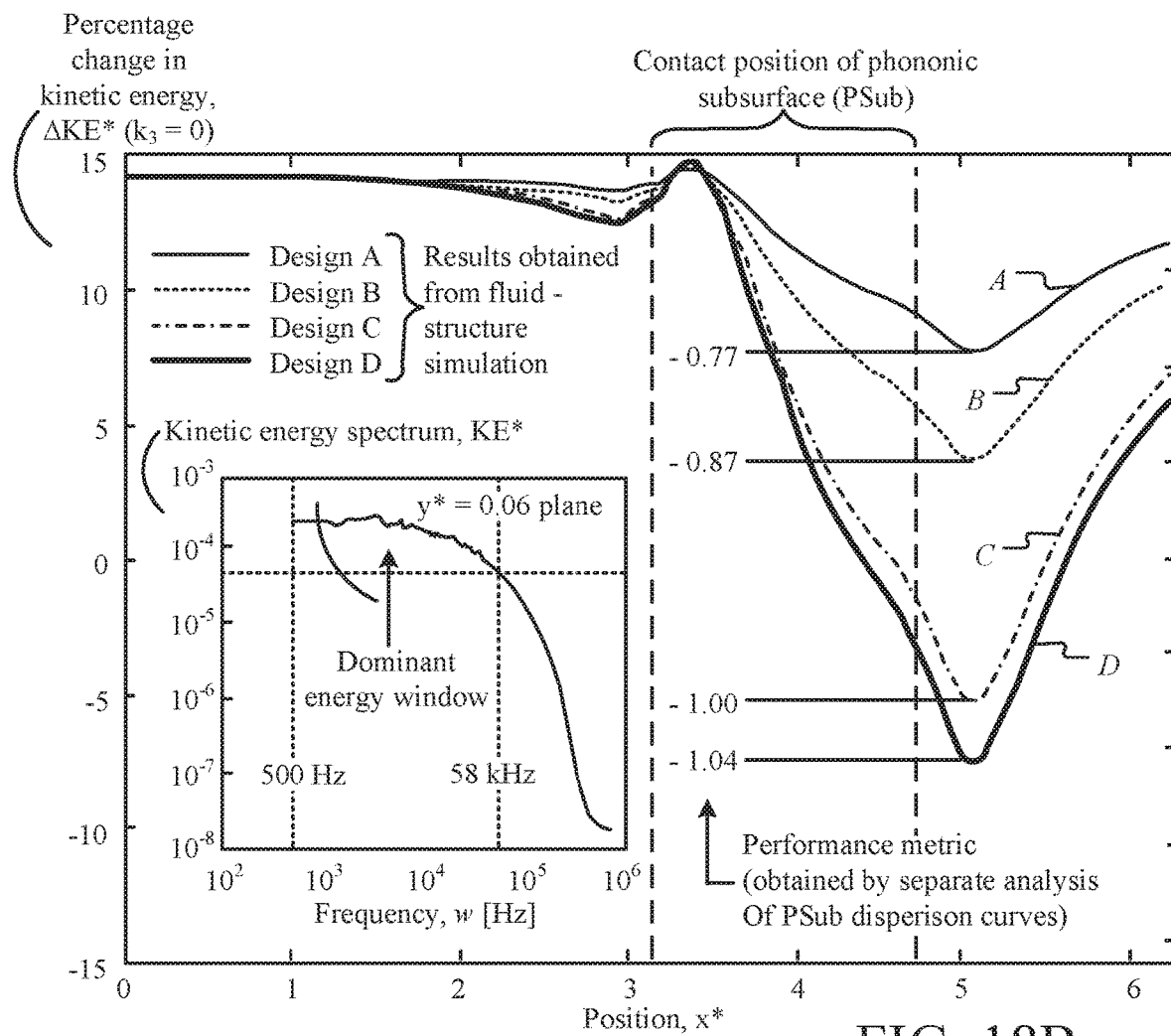
FIG. 18A
FIG. 18B

PHONONIC MATERIALS USED TO CONTROL FLOW BEHAVIOR

CROSS-REFERENCE TO RELATED APPLICATIONS

This application claims the benefit of U.S. provisional application No. 62/030,048, filed 28 Jul. 2014, which is hereby incorporated by reference in its entirety as though fully set forth herein.

GOVERNMENT RIGHTS

This invention was made with government support under grant number CMMI1131802 awarded by the National Science Foundation. The government has certain rights in the invention.

BACKGROUND

Field

The instant invention relates to the use of phononic materials in flow control.

Background

The interaction between a fluid and a solid surface in relative motion represents a dynamical process that is central to the problem of laminar-to-turbulent transition (and consequent drag increase) for air, sea and land vehicles, as well as wind turbines, long-range pipelines and other applications. Because skin friction drag is lower in laminar than in turbulent flows, its reduction can potentially be achieved by either delaying laminar-to-turbulent transition, or by controlling and attenuating turbulence and hence reducing wall-shear in fully developed turbulent flows.

The field of flow control may be traced back to prehistoric times when primitive tools and weaponry, such as spears and arrows, had features deliberately included to interact favorably with the surrounding flow. These features emerged by empirical evolution rather than an understanding of the underlying physics. The scientific method for flow control appeared only at the start of the twentieth century with Prandtl's proposition of the boundary layer theory accompanied by an explanation of the physics of flow separation, and a demonstration of several experiments for boundary layer control. Following this seminal contribution, the concept of flow control, especially for wall-bounded flows, emerged as a major research thrust in fluid mechanics and its development progressed over several stages, or eras, in which numerous passive and active approaches have been extensively investigated. These approaches encompass streamline shaping of the surface, surface heating or cooling, injection of polymer additives into the flow, addition of ribs on the surface, suction and blowing and coating of the surface with a compliant material, among others.

Regardless of the approach for stimulating a change in flow behavior, successful intervention may be realized when particular undesirable flow structures and mechanisms are identified and clearly understood. Concerning flow transition and increase in surface (skin friction) drag, the nucleation and growth of unstable disturbances are profoundly detrimental. Owing to their wave nature, the impediment of growth of these disturbances (i.e. their stabilization) is possible and may be induced by wave cancellation or at least a degree of destructive interference. Wave cancellation or superposition has been extensively investigated using active means. Results, however, have been modest especially when applied to complex conditions such as flow transition where primary disturbances give rise to residual disturbances at a variety of frequencies, phases and orientations, which render the control process intractable.

In a wall-bounded flow, there is a mutual dependence between the dynamic behavior of the fluid and the solid. This dependence is shaped by the nature of the fluid—structure interaction at the interface. It is therefore conceivable, in principle, to use the fluid to affect the constitutive response of the solid and, conversely, to favorably alter the 'character and disposition of a flow field' by tuning the elastodynamic response of the solid surface. As mentioned above, this latter notion has been explored in the literature by the utilization of surfaces with significantly compliant elastic properties. The concept was introduced in 1957 by Max O. Kramer after conducting an experiment on a motorboat in which a model with a dolphin-like skin was towed in the sea and shown to exhibit a more than 50% reduction in drag. Although this result was later questioned due to lack of well-controlled experimental conditions, it has helped trigger much interest in the subject. Numerous investigations were conducted on the ensuing effects on phenomena as complex as laminar-to-turbulent transition and skin-friction drag. A compliant surface predominantly admits Rayleigh elastic waves along the surface, and due to its low stiffness allows for the possibility of large surface motion and hence significant interaction with the flow. Its main advantage stems from its passivity and simplicity, i.e. no active control devices, wires, ducts and slots, etc. are needed. This is an economically desirable benefit, in fact critical, as the energy consumed in operating active devices may often exceed the energy saved by altering the flow. The concept, however, suffers from several crucial drawbacks. The large wall motion is mostly undesirable as it increases the likelihood of surface instabilities (e.g. flutter). Furthermore, a considerably high compliance is generally not welcome in intense operating environments where load-bearing materials are needed. A more fundamental disadvantage is that there is no clear route to mechanistic tuning for precise frequency- and phase-dependent intervention with the flow.

Turbulence in a flow includes an arrangement of counter-rotating streamwise vortices that are elongated along a streamwise direction interacting with streaks of high- and low-velocity fluid. During times when low-velocity fluid is pushed upward by rotation of the streamwise vortices, turbulence energy production intensifies.

In both high-pressure and low-pressure turbine blade passages, using any working fluid in liquid and/or gas phase, there may be a need to cool the blade material on both the suction and the pressure side of the passage. This can be achieved by passing a cooling fluid along turbine blades to cool the boundary layer fluid on the blade surfaces by convection. For efficient cooling, it is desirable to have high convection heat transfer rates which are possible when the flow is locally turbulent. This is a challenging issue because on the pressure side of the blade passage, flow relaminarizes and the convection heat transfer rates are low.

BRIEF SUMMARY

Phononic materials, methods of using phononic materials for use in interacting with a fluid or solid flow and methods for designing phononic materials for use with a flow are provided. In one implementation, a phononic material includes an interface surface and a subsurface feature. The interface surface is adapted to move in response to a pressure associated with at least one wave in a flow exerted on the interface surface. The subsurface feature extends from the interface surface. The subsurface feature comprises a phononic crystal or locally resonant metamaterial adapted to receive the at least one wave having the at least one frequency based upon the pressure from the flow via the interface surface and alter the phase of the at least one wave. The interface surface is adapted to vibrate at a frequency, phase and amplitude in response to the manipulated/altered phase of the at least one wave.

In another implementation, a method of controlling a flow includes moving an interface surface in response to a pressure associated with at least one wave having at least one frequency in a flow exerted on the interface surface. The method further includes receiving the at least one wave via a subsurface feature extending from the interface surface. The subsurface feature includes a phononic crystal or locally resonant metamaterial. The method also includes altering a phase of the at least one wave via the subsurface feature and vibrating the interface surface at a frequency, phase and amplitude in response to the altered phase of the at least one wave.

In yet another implementation a method of designing a phononic material is provided. In this implementation, the method includes designing a phononic subsurface material such that its phase relation is negative and its amplitude is controlled at the frequency of the flow wave in order to induce stabilization, or its phase relation is positive and its amplitude is controlled at that frequency in order to induce destabilization.

In another implementation, a phononic material for use in interacting with a fluid or solid flow is provided. In this implementation, the phononic material includes a subsurface feature and an interface surface. The subsurface feature extends from the interface surface. The subsurface feature includes a phononic crystal or locally resonant metamaterial adapted to receive at least one wave having at least one frequency based upon a body force from a modulated gravitational field and alter the phase of the at least one wave. The interface surface is adapted to interact with the flow by vibrating at a frequency, phase and amplitude in response to the altered phase of the at least one wave.

In yet another implementation, a phononic material for use in interacting with a fluid or solid flow is provided. In this implementation, the phononic material includes an interface surface and a subsurface feature. The interface surface is adapted to move in response to a pressure associated with at least one wave in a flow exerted on the interface surface. The subsurface feature extends from the interface surface. The subsurface feature includes a homogeneous and uniform elastic structure adapted to receive the at least one wave having the at least one frequency based upon the pressure from the flow via the interface surface and alter the phase of the at least one wave. The interface surface is also adapted to vibrate at a frequency, phase and amplitude in response to the altered phase of the at least one wave.

The phononic materials, methods of using phononic materials for use in interacting with a fluid or solid flow and methods for designing phononic materials for use with a flow may be used in a variety of applications including reduction of skin friction drag, advancement or delay of laminar-to-turbulent transition, enhancement or attenuation of turbulence, enhancement and/or absorption of energy in the fluids, advancement or delay of flow separation, enhancement or reduction of lift, enhancement or reduction of surface flutter, enhancement or reduction of fluid mixing, enhancement or reduction of heat generation at the fluid-structure interface, alteration of heat transfer within the flow by changing flow characteristics.

The foregoing and other aspects, features, details, utilities, and advantages of the present invention will be apparent from reading the following description and claims, and from reviewing the accompanying drawings.

BRIEF DESCRIPTION OF THE DRAWINGS

FIG. 3 depicts a plurality of example configurations of phononic crystals and locally resonant metamaterials that may be used to form a phononic subsurface.

FIGS. 4A-4E depict a plurality of example configurations of two-dimensional elastic metamaterials with one-dimensional locally resonant oscillators extending from a base material. These configurations may be used to form a phononic subsurface where the plates, where appropriate, may be oriented either in parallel or perpendicular or at an angle to the surface (and to the flow).

FIGS. 6A-6F depict other example configurations of two-dimensional elastic metamaterials with one-dimensional locally resonant oscillators extending from a base material—these configurations may be used to form a phononic subsurface where the plates, where appropriate, may be oriented either in parallel or perpendicular or at an angle to the surface (and to the flow).

FIGS. 7A and 7B depict yet other example configurations of two-dimensional elastic metamaterials with embedded resonant oscillators—these configurations may be used to form a phononic subsurface where the plates, where appropriate, may be oriented either in parallel or perpendicular or at an angle to the surface (and to the flow).

FIGS. 8A and 8B depict other example configurations of two-dimensional elastic metamaterials with two-dimensional locally resonant oscillators extending from a base material. These configurations may be used to form a phononic subsurface where the plates, where appropriate, may be oriented either in parallel or perpendicular or at an angle to the surface (and to the flow).

DETAILED DESCRIPTION

Design and construction of materials or structures that work on the fundamental concepts from phonon physics utilizing Bragg scattering and internal resonances (separately or in combination) are provided. In various implementations, the materials or structures can be implemented to open band gaps in their frequency responses to form stop bands to induce "out-of phasing" and, conversely, pass-bands to induce "in-phasing" in the interacting fluid flow (gases and liquids, single phase and multi-phase), as well as in flowing solids like ice and snow, they are in contact with, for the purpose of flow control. The stop-bands and pass-bands can also be designed to enhance and/or absorb energy in the fluids, advance or delay flow separation, enhance or reduce lift, reduce or enhance surface flutter and alter heat transfer within the flow by changing flow characteristics.

Figure 1A:
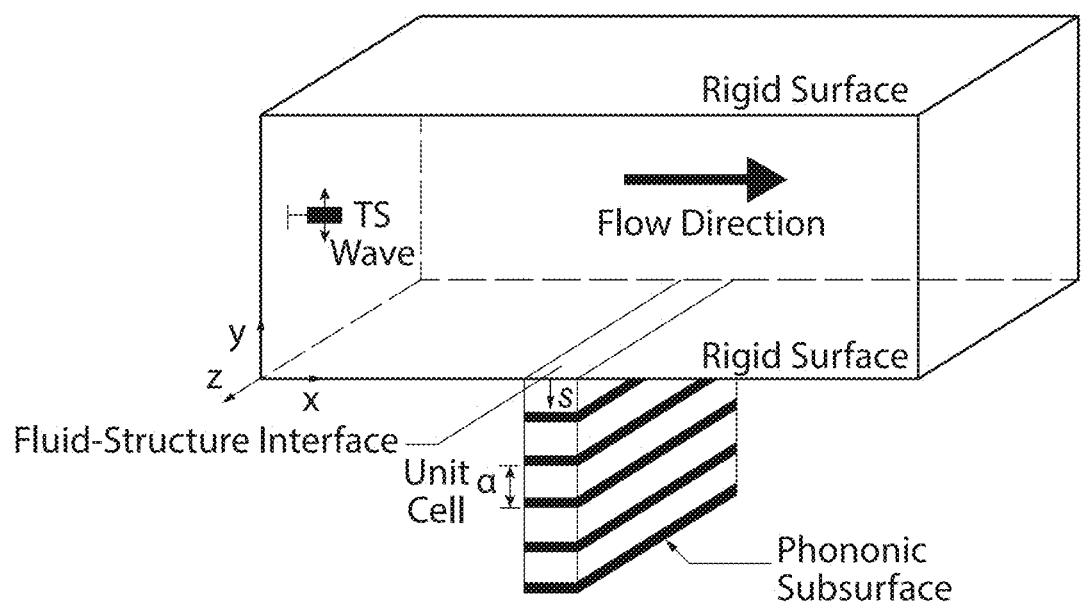
FIG. 1A is a schematic of a plane flow channel with a phononic subsurface incorporated covering a segment near the middle of the channel and extending across an entire span.

Phononic subsurface(s) include phononic crystals designed based on the Bragg scattering principle and/or locally resonant metamaterials that work on the principle of internal resonances and mode hybridization. The concept comprises the introduction of an elastic medium (phononic crystal or locally resonant metamaterial), located at one or more points or regions of interest along a surface, and extending in a manner such that its spatial periodicity is along a depth, e.g., perpendicular to the surface, at an angle to the surface, along the surface or any combination thereof. One example implementation is shown in FIG. 1A, in which a segment of a surface (e.g., a bottom surface) of a flow channel with otherwise all-rigid walls is replaced with a one-dimensional (1D) elastic phononic crystal with its periodicity extending along the depth. The phononic crystal shown in FIG. 1A may be replaced with other phononic crystal or locally resonant metamaterials described herein or in United States published patent application no. 20150015930 A1 to Mahmoud I. Hussein and Bruce L. Davis file on Apr. 7, 2014, which is incorporated by reference in its entirety as if fully set forth herein.

Stabilization can be accomplished within a stop band (at frequencies falling to the right of a truncation resonance) by inducing destructive interferences in the velocity and/or pressure fields of a flow that lead to attenuation of instability wave amplitudes in the flow. Conversely, flow destabilization is induced within a pass band (in certain frequency windows) by inducing constructive interferences in the velocity and/or pressure fields of a flow that amplify disturbance wave amplitudes in the flow. The flow in this context comprises the motion of a fluid medium of gas or liquid, or a gas-liquid mixture, or a gas-liquid-solid mixture, or a liquid-solid mixture, or a gas-solid mixture. The same concept comprising destructive and/or constructive interference of the velocity and/or pressure fields of a flow can also be used to control turbulent flows in order to reduce or enhance local skin friction and hence to reduce or enhance drag on surfaces and bodies that move in a fluid medium of gas or liquid, a gas-liquid mixture, a gas-liquid-solid mixture, a liquid-solid mixture or a gas-solid mixture. The same concept comprising destructive and/or constructive interference in the velocity and/or pressure fields of a flow is also utilized for enhancing/controlling the degree of mixing in laminar/turbulent liquid-gas mixtures, mixtures of different liquids, mixtures of different gases, mixtures of liquid-gas-solid, mixtures of liquid-solid, mixtures of gas-solid and combustibles, enhancing or attenuating heat transfer rates within the flow, advancing or delaying separation, enhancing or reducing lift, and/or reduce or enhance surface flutter.

One example methodology for designing a phononic subsurface for stabilizing an unstable wave at a particular frequency is as follows. First, the unit cell of the phononic subsurface is designed and optimized to exhibit a stop band (band-gap) encompassing the frequency of the instability wave. Then, a steady-state frequency response analysis is conducted on a model representing a finite structure composed of one or more unit cells of the type designed above. The unit cells may be laid out in the direction perpendicular, or parallel, or both, to the surface (and flow). The unit cell and possibly the end design and boundary conditions of the structure are then altered until the periodicity truncation resonance that is closest to the instability wave frequency is located as close as possible and to the left of the instability wave frequency. A performance metric is then used to evaluate the predicted performance of the phononic subsurface as explained in more detail below. The process is repeated until the predicted performance metric gives a negative value with the highest possible absolute value.

One advantage of this approach is that the phononic subsurface can be fully designed without carrying out any coupled fluid-structure simulations (which tend to be computationally expensive). However, a fluid-structure simulation may be conducted as a verification, especially to ensure that the level of damping (material and structural) in the phononic subsurface is optimal.

The same process as the one mentioned above may be adopted for destabilization, with the exception that (1) the unit cell in this case is designed to exhibit a pass band around the frequency of interest and (2) the structure overall (including the unit cell layout) is designed such that the frequency of interest matches a pass-band resonance frequency.

While the above descriptions are concerned with the manipulation of a single frequency (unstable wave for stabilization or vice versa), the methodology can be extended to cover particular frequencies and their harmonics (which is relevant to nonlinear instabilities and transition problems) and a range of frequencies (which is relevant to turbulence problems).

One goal of turbulent drag reduction is to destroy a sequence of events leading to turbulence by modifying the high-low velocity near-wall streak arrangement and/or to modify the streamwise vorticity pairs by altering a phase between v- and w-fluctuation velocities and shut-off a bursting process thus preventing or reducing the production of turbulent kinetic energy. It is also possible to reduce turbulent kinetic energy by decreasing its production by phase modification of u-v-components that are responsible for extracting energy from a mean flow over a wide frequency bandwidth. On this basis, a phononic subsurface may be tasked to decrease the intensity of energy containing eddies both by preventing or delaying their genesis, and also by reducing their effectiveness to extract energy from the mean motion. For this function to be passively realized, a phononic subsurface unit cell design process may be informed by the results of a series of turbulent flow simulations spanning a variety of conditions. For example, a frequency range of a spectrum of energy containing eddies and bursting frequency range may be used in designing a subsurface phononic material. With this information, a phononic subsurface may be designed focusing on v-field dephasing across prescribed frequency ranges with a particular design weight assigned to each of the flow mechanisms. This design may be tested in a coupled fluid-structure simulation, and the process repeated following a different weight.

In both high-pressure and low-pressure turbine blade passages, using any working fluid in liquid and/or gas phase, there may be a need to cool the blade material on both the suction and the pressure side of the passage. This can be achieved by passing a cooling fluid along turbine blades to cool the boundary layer fluid on the blade surfaces by convection. For efficient cooling, it is desirable to have high convection heat transfer rates which are possible when the flow is locally turbulent. This is a challenging issue because on the pressure side of the blade passage, flow relaminarizes and the convection heat transfer rates are low. Phononic materials/subsurfaces can be designed to locally enhance mixing by destabilizing the flow into turbulence over those regions of the blade passage where working fluid temperatures are high.

Effects of temperature and gravitational field modulation can be detrimental to space experiments and manufacturing processes which require reduction and elimination of natural convection driven by buoyancy as a result of the effects of gravity body force. In space, the reduction of natural convection and the resulting convective flows are expected to enhance material properties and performances. However, in a space-based experiment, or manufacturing process low-amplitude perturbations (G-jitter) caused by crew motions, equipment, solar drag, and other sources are experienced. The maximum G-Jitter amplitudes generated by these perturbations are of order $10^{-3}$ $g_0$ for equipment and $10^{-2}$ $g_0$ for crew motions where $g_0$ is terrestrial gravity. Compared to the base gravity level of order $10^{-6}$ $g_0$ in the space environment, these amplitudes are significant, and experiments and manufacturing processes with poor—low acceleration tolerance limits may be disturbed by the ensuing convective flows. It may be important to suppress such perturbations in order to retain the system's stability and prevent the generation of residual convective flows. These perturbations may be suppressed by installing a phononic material/subsurface tuned to match antiresonances with a wide frequency range encompassing the perturbations. A numerical simulation of this problem was presented in Numerical simulation of 3-D Benard convection with gravitational modulation by S. Biringen and L. J. Peltier in *Physics of Fluids* A, Vol. 2. No. 5. May 1990.

Implementation

Flow and Solid Surface Control

In some implementations, for example, phononic subsurfaces can be used in applications, such as, but not limited to any air, sea and land vehicles, manned and unmanned (drones), water and wind turbine blades, propellers, fans, steam and gas turbines blades, among other applications, for the purposes of drag reduction, drag enhancement, turbulence reduction, turbulence enhancement (e.g., in fluid mixing), linear instability suppression, nonlinear instability suppression, transition delay/promotion, enhanced maneuverability, lift enhancement; heat transfer control (enhancement and/or reduction), noise control, vibration control, flutter avoidance, inducing surface movement in all three coordinate directions; separation delay, among others.

Fluids

Examples of fluids that may be used with phononic subsurfaces such as described herein, include, but are not limited to, the following: all fluids, gases, liquids, single and multi-phase, mixtures, and the like. In one particular implementation, for example, air, water, oil, natural gas, sewage or other fluids may be used with phononic subsurfaces. Fluids can exist at room temperature, lower than room temperature, higher than room temperature. Applications cover static fluids, incompressible fluids, subsonic, transonic, supersonic, hypersonic flow regimes; laminar, turbulent and transitional flow regimes; smooth surfaces, surfaces with surface roughness—appearing naturally and by transition; instability, transition and turbulence—instigated naturally, with acoustic excitations, with finite-size roughness elements of any shape, plant canopies, others; by-pass instabilities, transition and turbulence.

Flow control applications cover all flow fields. These include (but are not limited to) external and internal flows, and their various combination; all flow fields are included.

External flows: Flows over aircraft wings (passenger aircraft, fighter aircraft, tankers, military aircraft, all fixed wing aircraft, rotary wing aircraft, helicopters, vertical take-off aircraft, re-usable space vehicles, aircraft with jet engines, aircraft with propellers, ship-based Navy aircraft); flow control in wing-body junctions, over fuselages, in and around aircraft engine inlets, turbines, over turbine blades, blade passages, wind turbine blades; wings of any cross-section, symmetric, non-symmetric, with and without camber, all wing, airfoil and hydrofoil profiles (including NACA and NASA airfoils), delta wings, folding wings, retractable wings, wing appendages, high-lift devices. Flows around sea vehicles including ships (battleships, cruise ships, cargo ships-manned), tankers, carriers, racing boats, sailing boats, unmanned boats submarines (manned and unmanned), deep-sea vehicles, hovercrafts, jet skis, water boards, among others. Flows around wind turbine blades of any type and water and steam turbines of any type.

Internal flows (of any fluid, gas and/or liquid): Flows in pipes, open or closed (channels), of any cross-sectional shape, and length, and at any temperature, and of sudden or gradual expansion; pipes of circular, square, elliptic, rectangular, triangular shapes, of any material; pipes with surface heating and/or cooling, pump-driven, gravity driven, buoyancy-driven. Pump impellers, steam turbines, pump and turbine inlet and outlet passages, flows over their blades.

The applications further cover ships, ship hulls, ship propellers, passenger ships, cruise ships, military ships of all kinds, sizes and uses, ordinance deployed in air and sea faring military manned and/or unmanned vehicles, speed boats, race boats, sail boats of all kind, used for pleasure, transportation, cargo, racing. Snow vehicles, alpine and cross-country skis, snow boards, paddle boats, wind surfing boards, parachute (ski) surfing boards, swim suits, skates, skate boards, water skiing boards.

Any solid surface that is made of any material may be used in the application of the key concept, including (but are not limited to) aluminum, plastic/polymer (all types), titanium, steel, copper, cement, rare earth; all materials (natural or synthetic) that are in contact with any fluid are included in the scope of the inventions covering the wide range of applications mentioned in this document.

Phononic Subsurface

Figure 2:
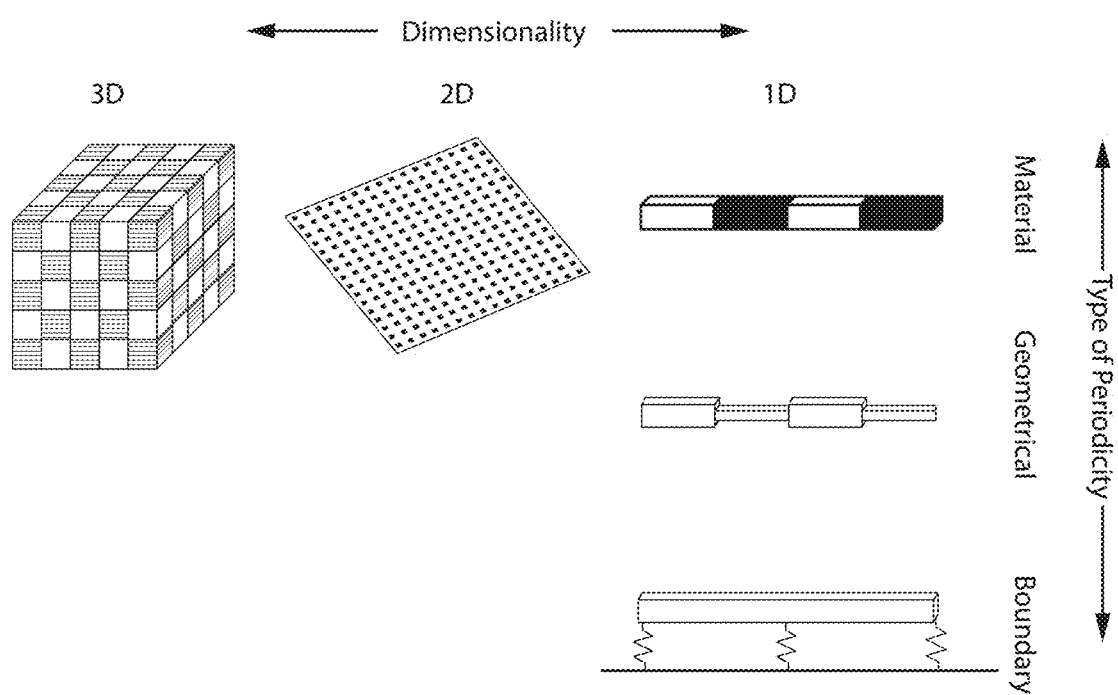
FIG. 2 depicts a plurality of example configurations of phononic crystals that may be used to form a phononic subsurface.

A phononic subsurface could be made of a phononic crystal (periodic composite material) and/or a locally resonant metamaterial (material with embedded or attached local resonators which can be laid our periodically or non-periodically). In both cases, a material variation or variation of geometric feature could extend in a one, two or three dimensional sense, and could comprise of one, two or more constituent materials. FIG. 2 demonstrates different example configurations of phononic crystals used in a phononic subsurface implementation. FIGS. 4-11 demonstrate different possible configurations of locally resonant metamaterials comprising the phononic subsurface.

In various implementations, phononic materials are used in or adjacent to a surface that interacts with a fluid (i.e., liquid and/or gas and/or flowing solid) flow. As described above, phononic materials refer to phononic crystals and/or locally resonant elastic metamaterials. Phononic crystals, which are spatially periodic, include materials designed based on the Bragg scattering principle. Locally resonant elastic metamaterials, which are not necessarily spatially periodic, include those that work on the principle of internal resonances and mode hybridization. The concept comprises the introduction of an elastic medium (e.g., a phononic crystal and/or locally resonant elastic metamaterial), located at one or more points or regions of interest along a surface, and, in one implementation, extending in a manner such that its spatial periodicity (or generally the direction of elastic wave propagation) is along a depth, e.g., at least generally perpendicular or at an angle to the surface, at least generally along the surface or both.

Further, the terms one-dimensional (1D), two-dimensional (2D) and three-dimensional (3D) are used herein to describe both the characteristics of various base material configurations as well as the shape, size, orientation, material composition and/or location/distribution of material/geometrical interfaces or local oscillators/resonators in a locally resonant metamaterial. A base material, for example, may be described as a one-dimensional (1D) base material in the shape of a wire or rod or column that extends, with the exception of other dimensions, in a generally single dimension. Similarly, a base material, such as a thin-film/membrane/sheet or plate-shaped base material may be described as a two-dimensional (2D) structure, with the exception of other dimensions, that extends in two dimensions. Also, a different base material, such as a bulk material, may be described as a three-dimensional (3D) base material. Similarly, local oscillators/resonators, such as pillars shown in FIG. 4 may also be described with respect to one, two or three dimensional structures as described below with reference to those figures.

In one implementation, local oscillators/resonators in the form of pillars are positioned periodically along one or both free surfaces of a plate base material. While the pillars in principle need not be arranged periodically for the hybridization effect to take root (the relaxation of the periodicity requirement is an advantage from the point of view of design/fabrication flexibility and insensitivity to geometric variations), the periodic positioning of the pillars in this particular implementation (1) provides an efficient way to compactly arrange the pillars, (2) allows for a systematic way to theoretically analyze, assess and design the locally resonant metamaterial, and (3) provides an additional mechanism for control of interface phasing and amplitude, namely, by Bragg scattering.

In another implementation, multiple pillar local oscillators/resonators are used on one or both free surfaces of a base thin-film material with each including a unique (distinct) height and/or cross-sectional area (see, for example, FIGS. 2D and 2E). In this implementation, utilization of multiple pillars (above and/or below the thin film), each of which has a distinct geometrical dimension (in terms of the height and/or the cross-sectional area) provides multiple distinct resonance sets, and the more resonant sets the more couplings/hybridizations/interactions that take place across the spectrum and this in turn leads to a richer design space for the performance metric.

One example implementation is shown in FIG. 1A in which a segment of a bottom surface of a flow channel with otherwise all-rigid walls is replaced with a one-dimensional (1D) elastic phononic crystal with a periodicity extending along a depth of the crystal. In this particular implementation, the flow channel comprises a plurality of walls, such as the four walls shown, and having a generally rectangular cross-section. In other implementations, the flow channel may comprise any shape such as having a generally circular, elliptical, square, polygon or other cross-section. The flow channel may also include varying dimensions, such as a narrowing or expanding flow channel.

In the implementation shown in FIG. 1A, for example, a flow direction of a fluid flowing through the flow channel flows in a first direction as shown by the arrow. A Tollmien-Schlichting (TS) wave propagates through the flow channel in the first direction. The flow channel includes a plurality of rigid surfaces defining the flow channel disposed within an inner boundary formed by the rigid surfaces. In one or more locations the rigid surface is replaced by the one-dimensional (1D) elastic phononic crystal as shown in FIG. 1A. In this implementation, the one-dimensional elastic phononic crystal includes a plurality of unit cells each of length a disposed in a stacked configuration extending in a depth direction, d, which in this implementation is generally perpendicular to a rigid surface of the flow channel along which a fluid flows in the flow channel.

A single unit cell of the phononic subsurface structure, in this implementation comprises a first layer and a second layer of different Young's modulus, density and layer thickness disposed adjacent to each other. In one example implementation, for example, the first layer may include a polymer, such as ABS, and the second layer may include a metal material, such as aluminum. However, these are merely examples and other materials are contemplated.

Figure 1B:
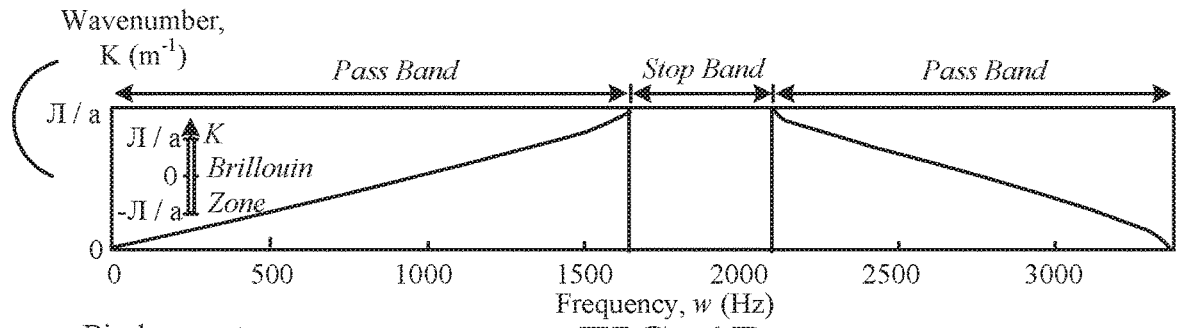
FIG. 1B depicts example dispersion curves for a one-dimensional phononic crystal from which the subsurface is composed (Brillouin zone illustrated in inset) as shown in FIG. 1A.
Figure 1C:
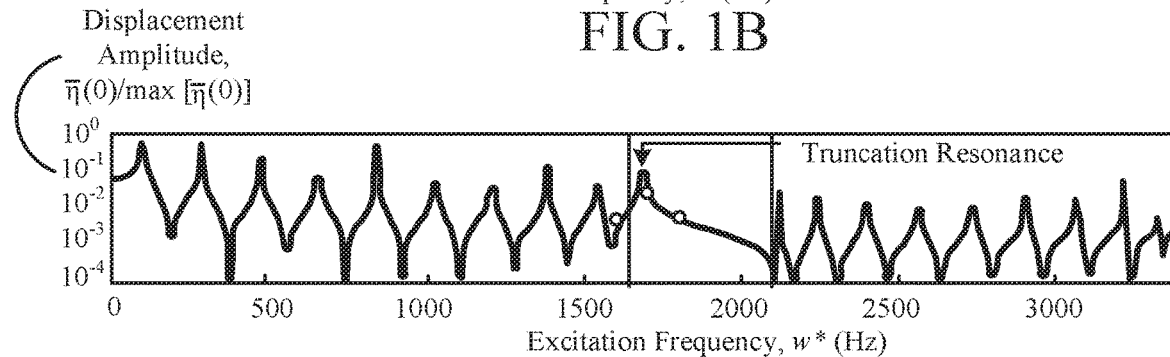
FIG. 1C depicts an example steady-state vibration response of the phononic crystal surface representing the interface with the flow as shown in FIG. 1A.
Figure 1D:
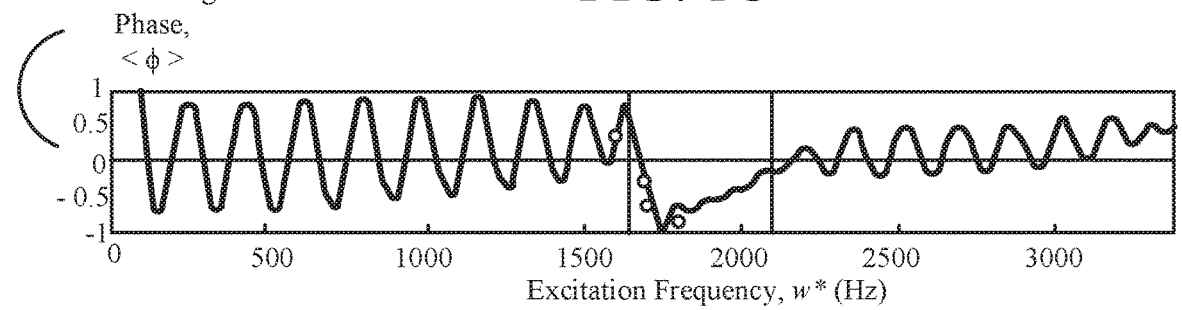
FIG. 1D depicts an example time-averaged phase between force and displacement at the phononic crystal surface representing the interface with the flow as shown in FIG. 1A.
Figure 1E:
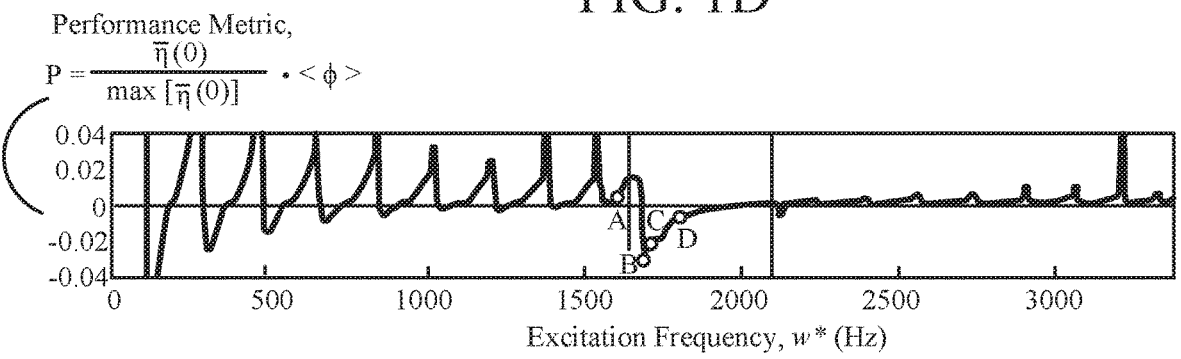
FIG. 1E depicts an example performance metric combining amplitude and relative phase between the force and the displacement at the phononic crystal surface representing the interface with the flow as shown in FIG. 1A.
Figure 1F:
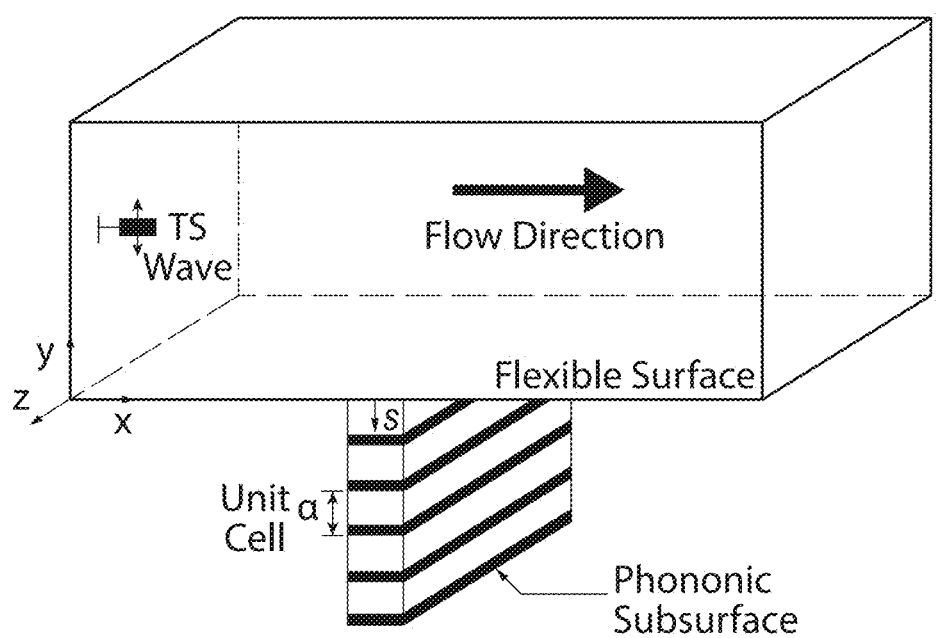
FIG. 1F is a schematic of another example plane flow channel with a phononic subsurface disposed outside a flexible surface of the flow channel.

FIG. 1F shows another example of a flow channel implementation in which a surface of a flow channel (e.g., the bottom surface shown in FIG. 1F) includes a flexible material that may move in response to a pressure exerted on the surface by a fluid flowing in the flow channel. A one-dimensional (1D) elastic phononic crystal with a periodicity extending along a depth of the crystal is disposed outside the flexible surface of the flow channel. Movement of the flexible surface correspondingly causes movement in an interface surface of the phononic material.

In this particular implementation, the flow channel comprises a plurality of walls, such as the four walls shown, and having a generally rectangular cross-section. In other implementations, the flow channel may comprise any shape such as having a generally circular, elliptical, square, polygon or other cross-section. The flow channel may also include varying dimensions, such as a narrowing or expanding flow channel.

In the implementation shown in FIG. 1F, for example, a flow direction of a fluid flowing through the flow channel flows in a first direction as shown by the arrow. A Tollmien-Schlichting (TS) wave propagates through the flow channel in the first direction. The flow channel includes a plurality of surfaces defining the flow channel disposed within an inner boundary formed by the surfaces. In this implementation, at least one of the surfaces comprises a flexible surface that interacts with the one-dimensional (1D) elastic phononic crystal as shown in FIG. 1F. In this implementation, the one-dimensional elastic phononic crystal includes a plurality of unit cells each of length a disposed in a stacked configuration extending in a depth direction, d, which in this implementation is generally perpendicular to a rigid surface of the flow channel along which a fluid flows in the flow channel.

A single unit cell of the phononic subsurface structure, in this implementation again comprises a first layer and a second layer of different Young's modulus, density and layer thickness disposed adjacent to each other. In one example implementation, for example, the first layer may include a polymer, such as ABS, and the second layer may include a metal material, such as aluminum. However, these are merely examples and other materials are contemplated.

The phononic material(s) interact with and alter phasing of waves in the flow. The interactions, for example, may increase stability and/or instability in the flow depending upon design. Phononic materials and structures including phononic materials may be designed and constructed utilizing fundamental concepts from phonon physics including Bragg scattering and internal resonances (separately or in combination) to form a band structure in their frequency responses, comprising stop bands (also known as band gaps) and pass bands (also known as bands). The band structure, for example, may form stop bands to induce "out-of phasing" and, conversely, pass-bands to induce "in-phasing" in the interacting fluid flow (gases and liquids, single phase and multi-phase), as well as in flowing solids like ice and snow, that are in contact directly with the phononic material(s) or indirectly when the phononic material(s) is/are located behind a flexible substrate/surface skin for the purpose of flow control. When a phononic material(s) is laid out in a manner adjacent to a surface (for example, underneath or behind a surface), the present application refers to it as a "phononic subsurface." The stop-bands and pass-bands, along with the structural resonance characteristics, can also be designed to enhance and/or absorb energy in the fluids, enhance or reduce lift, advance or delay separation, alter heat transfer, reduce or enhance flutter or increase or decrease turbulence.

Example tenets pertaining to the theory/technique are described in Hussein M I, Biringen S, Bilal O R, Kucala, A. Flow stabilization by subsurface phonons. *Proc. R. Soc. A* 471: 20140928 and in further detail below.

Designing a phononic subsurface material such its phase relation is negative at the frequency of the flow wave in order to induce stabilization, or positive at that frequency in order to induce destabilization. This phase relation may be obtained, for example, by simulating vibrations in the phononic material in a separate 'offline' calculation, with identical boundary conditions to the planned coupled fluid/structure configuration, and correlating between the phase of the excitation and that of the response at the part of the phononic material or structure that will be exposed to the flow, which is the interface or surface. This correlation can be taken (integrated) over an extended scan of time in order to ensure a steady state representation of the strength (positive or negative) of the frequency-dependent phase function.

The response amplitude of the interface or surface, or in general the part of the material that will be exposed to the flow, should be as high as possible (e.g., within a realm of small, infinitesimal vibrations) at the frequency of a flow wave (or spectra of waves) of interest in order for the out-of-phasing or in-phasing effects mentioned above to take effect.

In order to combine both the phase and amplitude effects together, a 'performance metric' may be devised that is the product of these two frequency-dependent quantities, the phase and the amplitude. At the frequency of the flow wave, the following results are expected:

High absolute value of negative performance metric—strong stabilization
Low absolute value of negative performance metric—weak stabilization
High absolute value of positive performance metric—strong destabilization
Low absolute value of positive performance metric—weak destabilization Since the phononic material (phononic crystal or locally resonant metamaterial) is finite in length, a truncation (local surface) mode/resonance appears in the spectrum and tends to fall within a stop band. The performance metric is negative to the right of this resonance and therefore the phononic subsurface unit cell may be designed such that this truncation resonance falls to the left of the frequency of the flow wave (or spectra of waves) that is to be stabilized.

Within a pass band, the performance metric oscillates between positive and negative across frequency windows bounded by the finite structure's resonances and antiresonances.

All the points made above for controlling a single flow wave at a particular frequency may be repeated for other flow waves with other frequencies appearing within the flow. One way to implement this multi-frequency strategy is to assemble a stack of phononic materials (phononic crystals and/or locally resonance metamaterials) next to each other, where each phononic material is designed to cover a particular frequency.

In principle, the structure used to control the flow may be a standard homogenous and uniform elastic structure for which the performance metric will similarly be used to guide the design. An advantage of using a phononic material, however, is that it is based on intrinsic unit-cell properties and is thus more robust to any changes to the boundary conditions during operation.

Control of flow propagation or properties, for example, may increase wave stability and/or instability depending on design characteristics. For example, stabilization may be accomplished or at least increased within a stop band (or more than one stop band) by inducing destructive interferences in the velocity and/or pressure fields of a flow that lead to attenuation of wave amplitudes (e.g., disturbance/instability wave amplitudes) in the flow at frequencies for which the performance metric is negative. Similarly, flow destabilization may be induced within a pass band (or more than one pass band) by constructive interferences in the velocity and/or pressure fields of a flow that amplify wave amplitudes (e.g., disturbance/instability wave amplitudes) in the flow at frequencies for which the performance metric is positive. Flow destabilization may also occur within a stop band at a frequency falling to the left of the truncation resonance frequency.

In one implementation, for example, a phononic subsurface may be designed to stabilize an unstable wave at a particular frequency as follows. A unit cell of a phononic subsurface is designed and optimized to exhibit a stop band (band-gap) encompassing, or at least partially encompassing, the frequency of an instability wave or the range of frequencies of several instability waves. A steady-state frequency response analysis may also be conducted on a model. The steady state frequency response analysis, for example, may include representing a finite structure composed of one or more unit cells of the type designed above. The unit cells may be laid out in a direction perpendicular, at an angle, parallel, or a combination thereof, to the surface (and flow). The unit cell and possibly the end design and boundary conditions of the structure may be altered until a periodicity truncation resonance (or more than one periodicity truncation resonance) that is closest to the instability wave frequency is (are) located as close as possible (or at least reasonably close to) and at least partially to the left of the instability wave frequency. A performance metric may be used to evaluate the predicted performance of the phononic subsurface as explained in Hussein M I, Biringen S, Bilal O R, Kucala, A. Flow stabilization by subsurface phonons. Proc. R. Soc. A 471: 20140928, which is hereby incorporated by reference in its entirety as if fully set forth herein. The process may be repeated until the predicted performance metric gives a negative value with the highest possible absolute value or at least a significant stabilizing effect.

One advantage of this example approach is that a phononic subsurface can be fully designed without carrying out any coupled fluid-structure simulations (which tend to be computationally expensive). However, a fluid-structure simulation may be conducted as a verification, especially to ensure that the level of damping (material and structural) in the phononic subsurface is optimal or at least satisfactory for a particular application.

The same process as the one mentioned above may be similarly adopted for destabilization, with the exception that (1) the unit cell in this case is designed to exhibit a pass band around the frequency of interest and (2) the structure overall (including the unit cell layout) is designed such that the frequency of interest matches, or at least overlaps with, a pass-band resonance frequency.

While the above descriptions are concerned with the manipulation of a single frequency (unstable wave for stabilization or vice versa), the methodology can be extended to cover particular frequencies simultaneously and their harmonics (which is relevant to nonlinear instabilities and transition control) and a range of frequencies (which is relevant to turbulence and turbulent flow control).

In one implementation of a flow-related system, for example, one or more phononic material structures may be designed to control a transition of a fluid from a laminar flow to a turbulent flow. The transition from a laminar flow to a turbulent flow can be delayed by increasing the stability of the flow. Similarly, the transition of the laminar flow to a turbulent flow may be controlled to be earlier than would otherwise be achieved by decreasing the stability of the flow.

FIG. 1B depicts example dispersion curves for a one-dimensional phononic crystal from which the subsurface is composed (Brillouin zone illustrated in inset) as shown in FIG. 1A. FIG. 1C depicts an example steady-state vibration response of the phononic crystal surface representing the interface with the flow as shown in FIG. 1A. FIG. 1D depicts an example time-averaged phase between force and displacement at the phononic crystal surface representing the interface with the flow as shown in FIG. 1A. FIG. 1E depicts an example performance metric combining amplitude and relative phase between the force and the displacement at the phononic crystal surface representing the interface with the flow as shown in FIG. 1A. In FIGS. 1C-1E, results obtained by analysing the phononic crystal alone (without coupling to the flow) are represented by black solid curves. Results from the coupled fluid-structure simulations are represented by dots. In FIG. 1C, the four coupled simulation data points are all multiplied by a single common constant to calibrate with the uncoupled model curve.

FIG. 2 shows a plurality of example configurations of phononic crystals that may be used to form a phononic subsurface. In this example, the phononic crystals are one-dimensional, two-dimensional or three-dimensional elastic phononic crystals. Each of the elastic phononic crystals also have a periodicity extending along the corresponding one-, two- or three dimensions of the crystal. In the one-dimensional example shown (also shown in FIG. 1), the periodicity of the phononic crystal extends along the depth (first) dimension as described above with reference to FIG. 1. The periodicity in the two-dimensional crystal example extends along two dimensions (e.g., length and width). In the three-dimensional example, the periodicity extends in three dimensions such as along x, y, and Z axes.

FIG. 2 also shows example types of periodicity that may exist in a phononic subsurface material. In one example, the periodicity may be due to component materials of the phononic subsurface material. In the example shown in FIG. 1A, for example, a unit cell includes two materials disposed adjacent to each other (e.g., polymer and metal such as ABS and aluminum) that together provide a periodicity that extends along one or more dimensions depending on the phononic subsurface structure being used. In another implementation, the periodicity may be due to a geometric design within one or more unit cells of the phononic subsurface structure. In the example shown in FIG. 2, for example, alternating layers having different lengths may provide for a periodicity extending along one or more dimensions depending on the phononic subsurface structure used. Similarly, a periodicity of a phononic subsurface structure may be provided by a boundary condition, such as periodic attachment to another medium.

FIGS. 4A-4E depict a plurality of example configurations of phononic crystals and metamaterials that may be used to form a phononic subsurface.

FIG. 4A, for example, shows different perspective views of one implementation of a plate including a generally two-dimensional (2D) uniform, periodic array of equal-sized pillars disposed on a single surface (e.g., a top surface) of the plate. Although the pillars are shown in FIG. 4A to have a square cross-section, they can have any other cross-sectional shape such as rectangle, circle, oval, triangle, polygon or other regular or irregular cross-sectional shape (see, for example, cross sections depicted in FIG. 5).

FIG. 4B similarly show different perspective views of a second implementation of a generally two-dimensional (2D) plate including a periodic, uniform array of equal-sized, pillars disposed on two sides/surfaces (e.g., top and bottom surfaces) of the plate. In this implementation, the size of the pillars on a first side of the plate (e.g., top pillars) could be equal to or different than the size of the pillars on a second side of the plate (e.g., bottom pillars). In addition, although the pillars are shown in FIG. 4B to have a square cross-section, they can have any other cross-sectional shape such as rectangle, circle, oval, triangle, polygon or other regular or irregular cross-sectional shape (see, for example, cross sections depicted in FIG. 5).

FIG. 4C show different perspective views of a third implementation of a generally two-dimensional (2D) plate with a periodic array of equal-sized pillars disposed on a first surface of the plate (e.g., on a top surface) with an empty row appearing every n number of rows (e.g., every third row in the implementation shown in FIG. 4C). Other distributions of full and empty rows, and columns, could also be employed.

FIG. 4D show different perspective views of a fourth implementation of a generally two-dimensional plate with a periodic array based on a multi-pillared unit cell having pillars with different heights. In the particular example shown in FIG. 4D, for example, each repeated unit cell has multiple pillars each of a different height but the same cross-sectional area and/or shape. In a different implementation, each repeated unit cell could have multiple pillars of different heights and also different cross-sectional areas. While in this configuration, there are four pillars in each unit cell, other configurations could include a larger or smaller number of pillars per unit cell, distributed on only one side or both sides of the thin film.

FIG. 4E shows different perspectives of a fifth implementation of a generally two-dimensional plate with a periodic array based on a multi-pillared unit cell having pillars with different cross-sectional areas. In the particular example shown in FIG. 4E, for example, each repeated unit cell has multiple pillars each of a different cross-sectional area but the same height and/or shape. In a different implementation, each repeated unit cell could have multiple pillars of different cross-sectional areas and also different heights and/or shapes. While in this configuration, there are four pillars in each unit cell, other configurations could include a larger or smaller number of pillars per unit cell.

Figure 5:
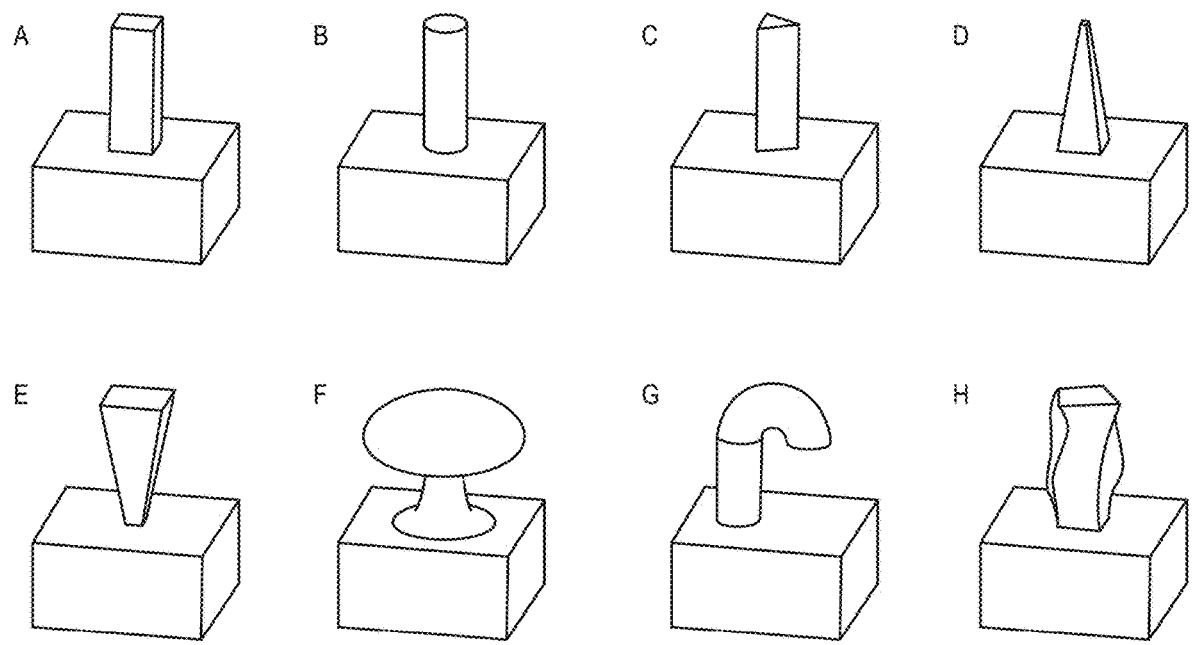
FIG. 5 depicts a plurality of example configurations of one-dimensional locally resonant oscillator geometries/shapes that extend from a base material (as shown in FIG. 4).

FIG. 5 depicts a plurality of example configurations of two-dimensional elastic metamaterials with one-dimensional locally resonant oscillators extending from a base material. These configurations may be used to form a phononic subsurface where the plates, where appropriate, may be oriented either in parallel or perpendicular or at an angle to the surface (and to the flow).

FIGS. 6A-6F depict a plurality of example configurations of one-dimensional locally resonant oscillator geometries/shapes that extend from a base material (as shown in FIG. 5).

FIG. 6A shows different perspective views of a sixth implementation of a generally two-dimensional (2D) plate including a two-dimensional (2D) periodic array of pillars disposed on a first and second surface of the plate (e.g., on a top surface and a bottom surface of the plate) in which a thickness (e.g., diameter) of the pillars vary randomly across different locations on the surface of the plate. In this implementation, the pillars on each side have same height, and the height of each pillar at the top is different than at the bottom. In another implementation, the height of each pillar at the top could be the same as at the bottom. Although pillars are shown on two sides in FIG. 6A, another implementation may have a similar configuration of pillars but on a single side only.

FIG. 6B shows different perspective views of a seventh implementation of a generally two-dimensional (2D) plate including a two-dimensional (2D) periodic array of pillars disposed on a first and second surface of the plate (e.g., on a top surface and a bottom surface of the plate) in which a height of the pillars vary randomly across different locations on the surface of the plate. In this implementation, the pillars on each side have the same thickness (e.g., diameter), and the thickness of each pillar at the top is the same than at the bottom. In another implementation, the thickness of each pillar at the top could be different than at the bottom. Although pillars are shown on two sides in FIG. 6A, another implementation may have a similar configuration of pillars but on a single side only.

FIG. 6C shows different perspective views of an eighth implementation of a generally two-dimensional (2D) plate including pillars disposed on a single surface (e.g., on a top surface) and whose positions and heights are random while their thicknesses are all the same. Although pillars are shown on a single side in FIG. 6C, another implementation may have a similar configuration of pillars but on two surfaces of a plate.

FIG. 6D shows different perspective views of an ninth implementation of a generally two-dimensional (2D) plate including pillars disposed on a single surface (e.g., on a top surface) and whose positions and thicknesses are random while their heights are all the same Although pillars are shown on a single side in FIG. 6D, another implementation may have a similar configuration of pillars but on two surfaces of a plate.

FIG. 6E shows different perspective views of a tenth implementation of a generally two-dimensional plate including a random (i.e., non-periodic) array of pillars on a single surface (e.g., on a top surface) with the thickness (e.g., diameter), shapes and heights of the pillars varying randomly across the different sites. Although pillars are shown on a single side in FIG. 6E, another implementation may have a similar configuration of pillars but on two surfaces of a plate.

FIG. 6F shows a configuration of an eleventh implementation based on a vertical stacking of the of the pillared plate shown in FIG. 4A. The different features shown in other figures such as pillar spacing (see, for example, FIG. 4C), multi-pillar unit cell (see, for example, FIGS. 4D and 4E), walled configuration (see, for example, FIGS. 8A and 8B and their corresponding descriptions) and random pillars (see, for example, FIGS. 6A and 6D) may also apply to this vertical stacking configuration. While the figure shows, as an example three layers of pillared thin films stacked on top of each other, the number of layers of pillared thin films stacked could vary.

FIGS. 7A and 7B depict other example configurations of two-dimensional elastic metamaterials with one-dimensional locally resonant oscillators extending from a base material—these configurations may be used to form a phononic subsurface where the plates, where appropriate, may be oriented either in parallel or perpendicular or at an angle to the surface (and to the flow).

FIG. 7A shows different perspective views of another implementation of a generally two-dimensional plate including a bridged structure having a central cylinder supported by thin arms (e.g., beams). In this implementation, for example, the unit cell may be repeated to form a periodic or non-periodic array. The central cylinder (which could be of the same material as the main body of the thin film, or a heavier material) acts as a local oscillator/resonator in this configuration. Other shapes for oscillators/resonators in this configuration (e.g., square cylinder, sphere, others) may be employed, and the supporting arms also could have other shapes, number and orientations. This configuration concept could also be realized in the form of a 2D thick plate-like material with each oscillator/resonator taking the shape of a cylinder, or sphere or other shape.

FIG. 7B shows different perspective views of yet another implementation of a generally two-dimensional plate with a periodic array of circular inclusions comprising a highly complaint material (i.e., a material that is significantly less stiff than the material from which the main body of the thin film is made). In this particular implementation, for example, each inclusion of a compliant material in this configuration may act as an oscillator/resonator (i.e., similar to each pillar in FIG. 4A). Other shapes and sizes for the inclusions may also be adopted. The sites of the compliant inclusions may be ordered in a periodic fashion (as shown) or may be randomly distributed (as in FIGS. 6C and 6D). Similarly, the size of each inclusion may be uniform or may vary in groups (as in FIGS. 4D and 4E) or vary randomly.

FIGS. 8A and 8B depict yet other example configurations of two-dimensional elastic metamaterials with embedded resonant oscillators—these configurations may be used to form a phononic subsurface where the plates, where appropriate, may be oriented either in parallel or perpendicular or at an angle to the surface (and to the flow).

FIG. 8A shows different perspective views of a fourteenth implementation of a generally two-dimensional (2D) plate including a one-dimensional (1D) periodic array of equal-sized walls disposed on a first surface of the plate (e.g., a top surface of the plate). In this particular implementation, each wall acts as an oscillator/resonator representing a 2D version of a pillar. The walls have a uniform cross section along the length, but other configurations could have a periodically or non-periodically varying cross-section along the length of the wall. Although walls are shown on a single side in FIG. 8A, another implementation may have a similar configuration of walls but on two surfaces of a plate.

FIG. 8B shows different perspective views of a fifteenth implementation of a generally two-dimensional (2D) plate including a two-dimensional (2D) periodic array of equal-sized or different sized walls disposed on a first surface of the plate (e.g., a top surface of the plate). In this particular implementation, each wall acts as an oscillator/resonator representing a 2D version of a pillar. Each wall has a uniform cross section along the length, but other configurations could have a periodically or non-periodically varying cross-section along the length of each wall. The thickness of the vertical walls could be different than the thickness of the horizontal walls. Although walls are shown on a single side in FIG. 8B, another implementation may have a similar configuration of walls but on two surfaces of a plate.

Figure 9A:
FIGS. 9A and 9B depict yet other example one-dimensional elastic metamaterials with one-dimensional locally resonant oscillators extending from a base material. These configurations may be used to form a phononic subsurface where the rods may be oriented perpendicular or at angle to the surface (and to the flow), similar to the relative orientation between the flow and the phononic material shown in FIG. 1A.
Figure 9B:

FIGS. 9A and 9B depict other example configurations of two-dimensional elastic metamaterials with two-dimensional locally resonant oscillators extending from a base material. These configurations may be used to form a phononic subsurface where the plates, where appropriate, may be oriented either in parallel or perpendicular or at an angle to the surface (and to the flow).

FIG. 9A show different perspective views of a sixteenth implementation of a generally one-dimensional (1D) wire, rod, column or beam medium including a cyclic periodic array of equal-sized pillars disposed along the circumference of the main body medium. In this particular implementation, each pillar acts as an oscillator/resonator. In other implementations, the pillars may have other shapes. While in this configuration, eight pillars protrude at each lattice site, other configurations could include a larger or smaller number of pillars per lattice site.

FIG. 9B show different perspective views of a seventeenth implementation of a generally one-dimensional (1D) wire, rod, column or beam medium including a cyclic distribution of pillars of different heights disposed along the circumference of the main body medium. In this particular implementation, each pillar acts as an oscillator/resonator. In other implementations, the pillars may have other shapes. While in this configuration, four pillars protrude at each lattice site, other configurations could include a larger or smaller number of pillars per lattice site. Furthermore, in other implementations, the radial distribution of the pillars could be random. Furthermore, in other implementations, the heights of the pillars and/or shapes and/or thicknesses could be random along both the radial and axial directions.

Figure 10A:
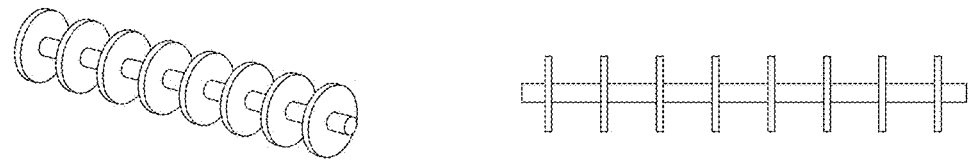
FIGS. 10A and 10B depict other example configurations of one-dimensional elastic metamaterials with one-dimensional locally resonant oscillators extending from a base material. In various implementations, these configurations may be used to form a phononic subsurface where the rods may be oriented perpendicular or at an angle to the surface (and to the flow), similar to the relative orientation between the flow and the phononic material shown in FIG. 1A.
Figure 10B:
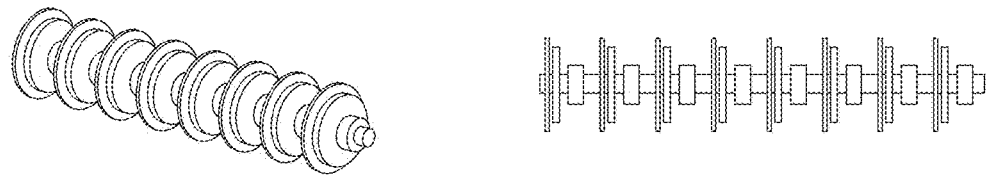

FIGS. 10A and 10B depict yet other example one-dimensional elastic metamaterials with one-dimensional locally resonant oscillators extending from a base material. These configurations may be used to form a phononic subsurface where the rods may be oriented perpendicular or at angle to the surface (and to the flow), similar to the relative orientation between the flow and the phononic material shown in FIG. 1.

FIG. 10A shows different perspective views of another implementation of a generally one-dimensional (1D) wire, rod, column or beam medium including a one-dimensional (1D) periodic array of cylinders disposed along the axis of the main body medium. In this particular implementation, each cylinder acts as an oscillator/resonator. In other implementations, the cylinders may have other shapes.

FIG. 10B show different perspective views of a nineteenth implementation of a generally one-dimensional (1D) wire, rod, column or beam medium including a one-dimensional (1D) periodic array where each unit cell consists of multiple cylinders of different diameters and/or thicknesses disposed along the along the axis of the main body medium. In this particular implementation, each cylinder acts as an oscillator/resonator. In other implementations, the cylinders may have other shapes. While in this configuration, there are three cylinders in each unit cell, other configurations could include a larger or smaller number of cylinders per unit cell. Furthermore, in other implementations, the size, shape and positioning of the cylinders along the axis of the main body may be random.

FIG. 5 shows a variety of shapes and designs for a pillar. Any of these designs, or other shapes that would allow the pillar to function as an oscillator/resonator, may be applied in conjunction with the numerous design concepts/features shown FIGS. 4, 6 and 9.

Figure 11A:
FIGS. 11A and 11B depict yet other example configurations of three-dimensional elastic metamaterials with embedded resonant oscillators. In various implementations, these configurations may be used to form a phononic subsurface where the periodic features may be oriented in any direction with respect to the surface (and the flow).
Figure 11B:
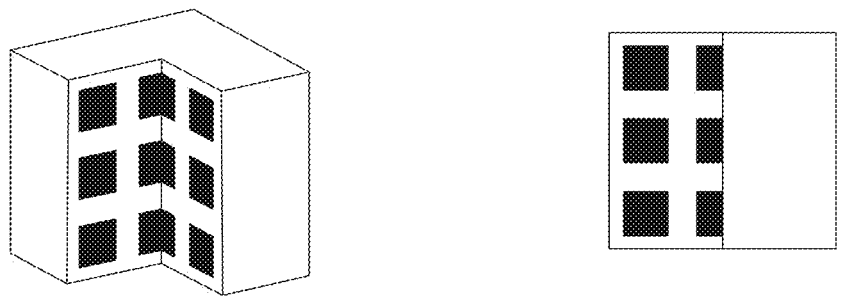

FIGS. 11A and 11B depict yet other example configurations of three-dimensional elastic metamaterials with embedded resonant oscillators. In various implementations, these configurations may be used to form a phononic subsurface where the periodic features may be oriented in any direction with respect to the surface (and the flow).

FIG. 11A shows different perspective views of yet another implementation of a 3D material configuration including a bridged structure having a central sphere supported by thin arms (e.g., beams). In this implementation, for example, the unit cell may be repeated to form a periodic or non-periodic array. The central sphere (which could be of the same material as the main body of the thin film, or a heavier material) acts as a local oscillator/resonator in this configuration. Other shapes for oscillators/resonators in this configuration (e.g., cubic sphere, cylinder, others) may be employed, and the supporting arms also could have other shapes, number and orientations. In analogy to the configuration shown in FIG. 11A (which is a 2D version), the sites of the local resonators may be ordered in a periodic fashion (as shown) or may be randomly distributed.

FIG. 11B shows a 3D material configuration with a periodic array of cubic inclusions comprising a highly complaint material (i.e., a material that is significantly less stiff than the material from which the main body is made). The compliant material in this configuration acts as an oscillator/resonator (i.e., similar to the pillars in FIG. 4A). Other shapes for the inclusions may be adopted. In analogy to the configuration shown in FIG. 7B (which is a 2D version of FIG. 11B), the sites of the compliant inclusions may be ordered in a periodic fashion (as shown) or may be randomly distributed. Similarly, the size of each inclusion may be uniform or may vary in groups or vary randomly.

Figure 12A:
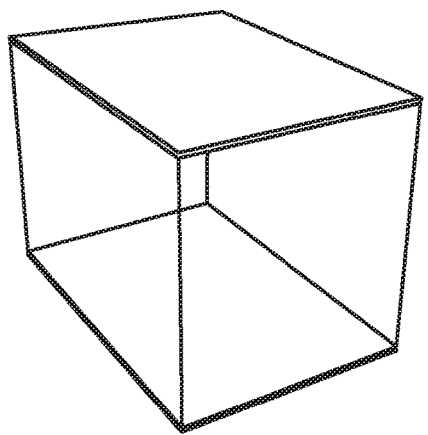
FIGS. 12A, 12B and 12C depict example configurations of pipelines or tubes with (a) no phononic subsurface installed, (b) a phononic subsurface installed at two of the edges in the form of a phononic crystal or (c) a phononic subsurface installed at two of the edges in the form of a locally resonant metamaterial installed.
Figure 12B:
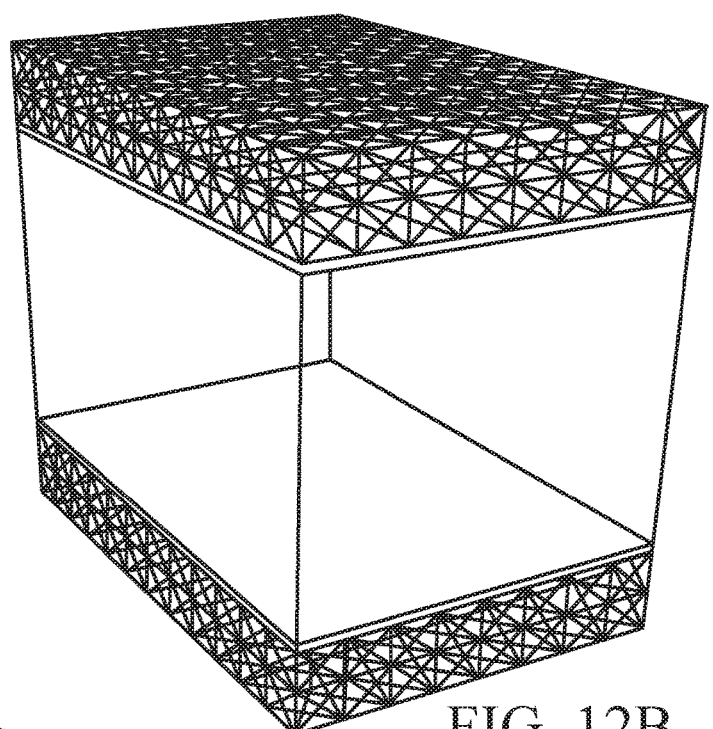
Figure 12C:
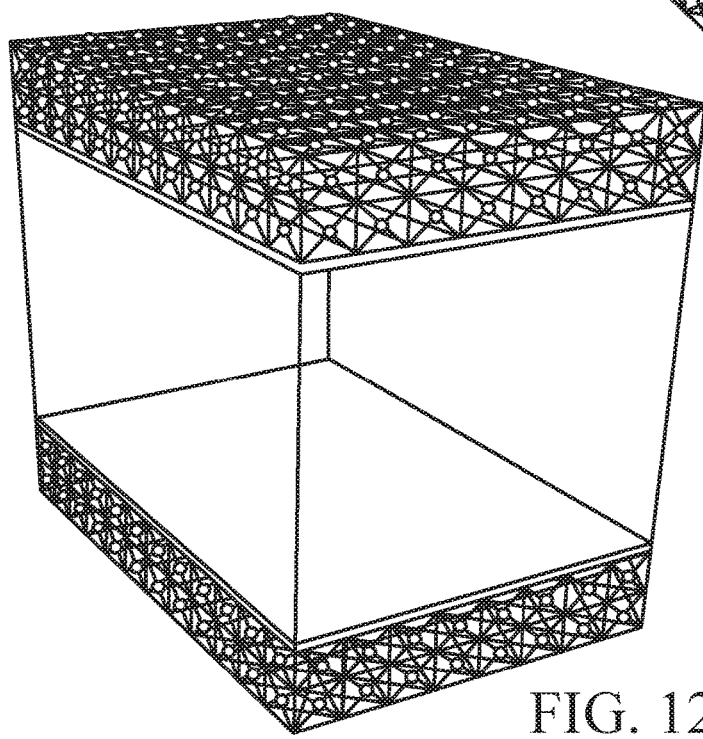

FIG. 12 depicts example configurations of pipelines or tubes with (a) no phononic subsurface installed, (b) a phononic subsurface installed at two of the edges in the form of a phononic crystal or (c) a phononic subsurface installed at two of the edges in the form of a locally resonant metamaterial installed.

Figure 13A:
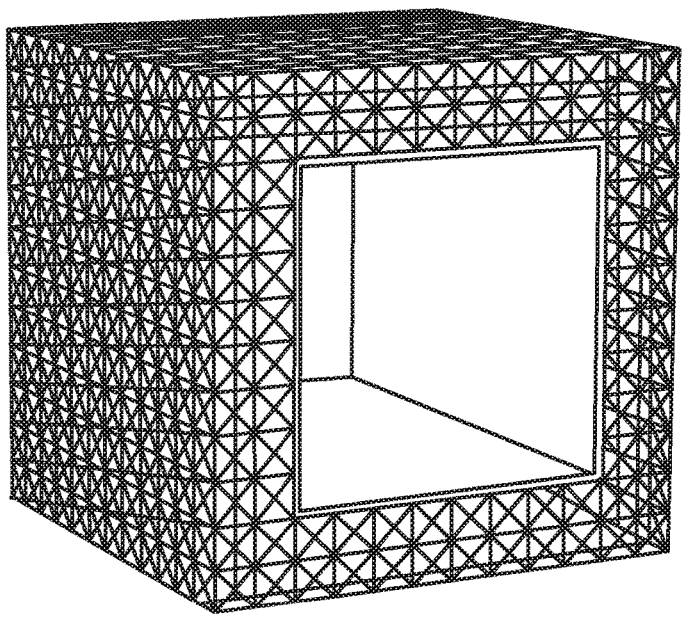
FIGS. 13A-13C depict schematic views of example closed channels (e.g., tubes of pipeline) utilizing a phononic subsurface.
Figure 13B:
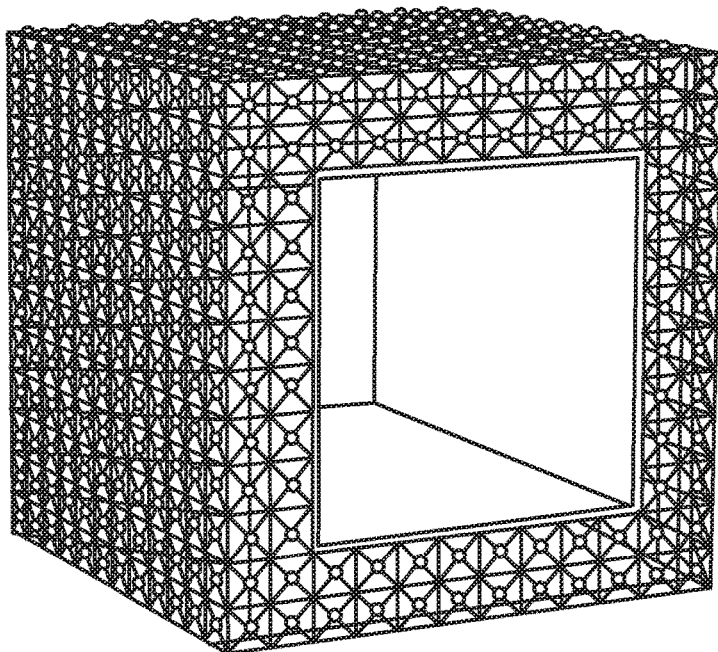
Figure 13C:
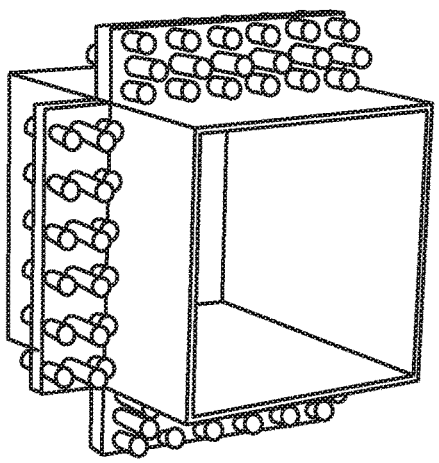

FIGS. 13A-13C depicts schematic views of example closed channels (e.g., tubes of pipeline) utilizing a phononic subsurface based on (FIG. 13A) a beam-truss lattice (a form of a 3D phononic crystal), (FIG. 13B) beam-truss lattice with local masses (a form of a 3D locally resonant metamaterial), and (FIG. 13C) an extrusion of a pillared plate structure from each wall (a form of a 2D locally resonant metamaterial). In (FIG. 13B), the orientation of the bulk-like metamaterial with respect to the channel walls is an example of how the 3D metamaterial configuration shown in FIG. 11 could be oriented. In (FIG. 13C), the orientation of the plate-like metamaterial with respect to the channel walls is an example of how the 2D metamaterial configuration shown in FIGS. 4, 6, 7 and 8 could be oriented Further, although several implementations described within this application, individual phononic materials/structures may be arranged in a spatially varying manner in which individual materials/structures may work alone or in combination with one or more other materials/structures to provide stabilizing and/or destabilizing effects on a flow or other application. For example, individual phononic material/structures may be arranged similar to "pixels" or other unit materials/structures and arranged in any manner with respect to a surface. Further, such phononic materials/structures may also operate passively and or dynamically and may further be controlled in any manner to achieve desired flow control characteristics. For example, different groups of phononic materials/structures may increase stability in one spatial region of a flow and increase another spatial region. The individual phononic materials/structures may respond passively (e.g., always on) to any flow adjacent to the surface that the phononic material/structure is forming or is adjacent to. Some or all of the phononic materials/structures may also be actively controlled (e.g., turned on or off) depending on various design characteristics. In one implementation, stability inducing phononic materials/structures may be activated when a flow is more turbulent than desired for a particular application, while instability inducing phononic materials/structures may be activated when a flow is less turbulent than desired for an application. Further, destabilizing and stabilizing phononic materials/structures may be utilized on different areas of a surface to increase and/or decrease flow stability in different areas of a surface (e.g., a surface of an aircraft during flight). Phononic materials/structures can be implemented as single or multiple "strips" or regions of varying geometry and size (e.g., thickness) covering only a portion of the surface, or the phononic material/structure can cover the whole surface area (for example the whole upper and lower surface of an aircraft wing). These strips, or regions, may be placed forming any angle between the strip or region axis and the flow direction; all strip or region axes may be aligned at the same angle with the flow direction, or the angle between strip or region axes and the flow direction may be different for each strip or region or for a group of strips or groups of regions. Phononic materials/structures for flow control and/or drag reduction may be implemented by themselves, or in combination with any other passive and/or active flow control/drag reduction instrument, including any methods, mechanisms and materials for flow control.

Figure 14:
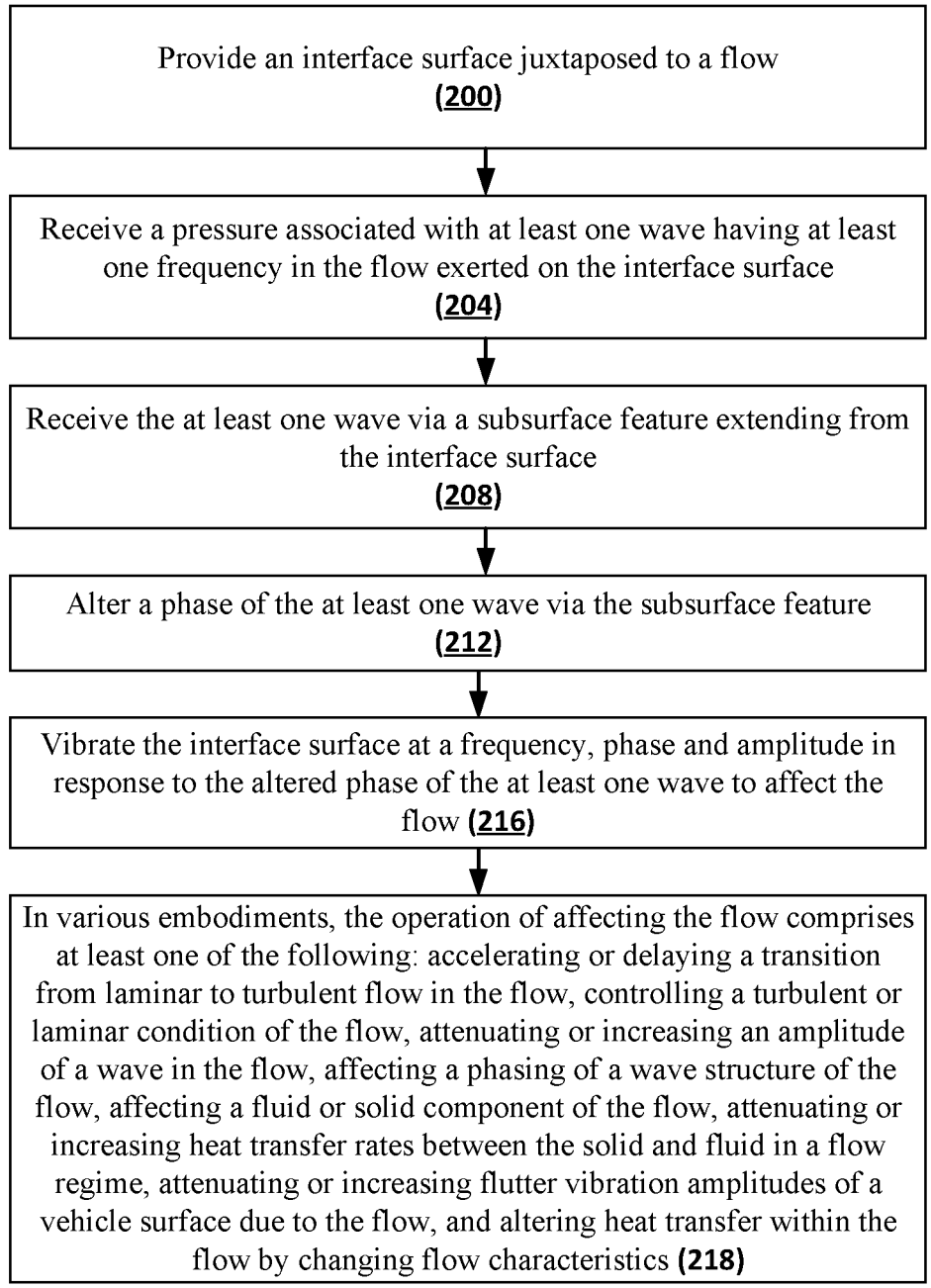
FIG. 14 depicts a flow chart showing an example method of controlling a flow.

FIG. 14 is a flow chart showing an example method of controlling a flow. In this embodiment, an interface surface is provided juxtaposed to a flow in operation 200. A pressure associated with at least one wave having at least one frequency in the flow exerted on the interface surface is received in operation 204. The at least one wave is received via a subsurface feature extending from the interface surface in operation 208. The subsurface feature comprises a phononic crystal or locally resonant metamaterial. A phase of the at least one wave is altered via the subsurface feature in operation 212. The interface surface is vibrated at a frequency, phase and amplitude in response to the altered phase of the at least one wave to affect the flow in operation 216. In various embodiments, the operation of affecting the flow comprises at least one of the following: accelerating or delaying a transition from laminar to turbulent flow in the flow, controlling a turbulent or laminar condition of the flow, attenuating or increasing an amplitude of a wave in the flow, affecting a phasing of a wave structure of the flow, affecting a fluid or solid component of the flow, attenuating or increasing heat transfer rates between the solid and fluid in a flow regime, attenuating or increasing flutter vibration amplitudes of a vehicle surface due to the flow, and altering heat transfer within the flow by changing flow characteristics as shown in 218.

Although embodiments of this invention have been described above with a certain degree of particularity, those skilled in the art could make numerous alterations to the disclosed embodiments without departing from the spirit or scope of this invention. For example, although structures (such as plates) may be shown as a specific shape (e.g., square or rectangular) in various figures, other shapes may also be used. All directional references (e.g., upper, lower, upward, downward, left, right, leftward, rightward, top, bottom, above, below, vertical, horizontal, clockwise, and counterclockwise) are only used for identification purposes to aid the reader's understanding of the present invention, and do not create limitations, particularly as to the position, orientation, or use of the invention. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other. It is intended that all matter contained in the above description or shown in the accompanying drawings shall be interpreted as illustrative only and not limiting. Changes in detail or structure or configuration or design or shape or size or orientation or composition or other features pertaining to appearance may be made without departing from the spirit of the invention as defined in the appended claims.

What is claimed is:

1. A method of controlling a flow comprising:
providing an interface surface juxtaposed to the flow;
receiving a pressure associated with at least one wave having at least one frequency in the flow exerted on the interface surface;
receiving the at least one wave via a subsurface feature extending from the interface surface, the subsurface feature comprising a phononic crystal or locally resonant metamaterial;
altering a phase of the at least one wave via the subsurface feature; and
vibrating the interface surface at a frequency, phase and amplitude in response to the altered phase of the at least one wave.

2. The method of claim 1 wherein the method comprises affecting the flow.

3. The method of claim 2 wherein the operation of affecting the flow comprises at least one of the group comprising: accelerating or delaying a transition from laminar to turbulent flow in the flow, controlling a turbulent or laminar condition of the flow, attenuating or increasing an amplitude of a wave in the flow, affecting a phasing of a wave structure of the flow, affecting a fluid or solid component of the flow, attenuating or increasing heat transfer rates between the solid and fluid in a flow regime, attenuating or increasing flutter vibration amplitudes of a vehicle surface due to the flow, and altering heat transfer within the flow by changing flow characteristics.

4. The method of claim 3 wherein a flow regime of the flow comprises one or more of the group comprising: laminar, turbulent, transitions, high speed, low speed, supersonic and hypersonic flows.

5. The method of claim 2 wherein the flow comprises one of an internal flow and an external flow.

6. The method of claim 2 wherein the operation of affecting the flow comprises attenuating or increasing an amplitude of at least one wave in a flow.

7. The method of claim 2 wherein the operation of affecting the flow comprises affecting a phasing of a plurality of interacting waves of the flow.

8. The method of claim 2 wherein the operation of affecting the flow comprises reducing the skin friction drag on the surface interface surface with the flow.

9. The method of claim 2 wherein the operation of affecting the flow comprises stabilizing the at least one wave at the surface at supersonic or hypersonic speeds to reduce skin friction drag.

10. The method of claim 2 wherein the operation of affecting the flow comprises stabilizing the at least one wave at the interface surface at supersonic or hypersonic speeds to reduce subsequent temperature increase at the surface.

11. The method of claim 2 wherein the vibration of the interface surface is adapted to alter at least one of a velocity field and a pressure field of the flow near the interface surface.

12. The method of claim 2 wherein the fluid-structure interaction through the interface takes place over numerous cycles or temporal periods.

13. The method of claim 2 wherein the phononic crystal or locally resonant elastic metamaterial is adapted to create a band structure.

14. The method of claim 13 wherein the band structure comprises a stop band and the operation of affecting the flow comprises providing at least one of a truncation resonance, a stop band, and a pass band.

15. The method of claim 14 wherein interface motion at stop band frequencies corresponding to negative performance metric values interact with the wave of the flow by attenuating an amplitude of the wave.

16. The method of claim 2 wherein the interface surface comprises at least one of the group comprising:
is disposed juxtaposed a flow surface;
is disposed at a flow surface or behind a flow surface and is adapted to passively or actively interact with a flow;
is integrated with a flow surface; and
is disposed adjacent to a flow surface not influenced by the subsurface feature.

17. The method of claim 1 wherein the interface surface is disposed adjacent to the flow.

18. The method of claim 1 wherein a flow surface is disposed between the interface surface and the flow.

19. The method of claim 1 wherein the phononic crystal or locally resonant elastic metamaterial is adapted to interact with the flow via coupling or hybridizing with a wave of the flow.

20. The method of claim 1 wherein the method comprises altering at least one wave in a flow exerted on the surface at supersonic or hypersonic speeds by reducing at least one of skin friction drag and heat generation.

21. The method of claim 1 wherein the subsurface feature comprises a lattice subsurface feature.

* * * * *